US012658006B2

(12) United States Patent
Ben Lulu

(10) Patent No.: US 12,658,006 B2
(45) **Date of Patent: *Jun. 16, 2026**

(54) SYSTEMS, DEVICES AND METHODS FOR NETWORK MANAGEMENT OF REMOTE MODIFICATION OF CARDS

(71) Applicant: DBEST Limited Liability Company, Kyiv (UA)

(72) Inventor: Dekel Ben Lulu, Kyiv (UA)

(73) Assignee: DBEST Limited Liability Company, Kyiv (UA)

( * ) Notice: Subject to any disclaimer, the term of this patent is extended or adjusted under 35 U.S.C. 154(b) by 217 days.

This patent is subject to a terminal disclaimer.

(21) Appl. No.: 18/387,553

(22) Filed: Nov. 7, 2023

(65) Prior Publication Data

US 2024/0070407 A1 Feb. 29, 2024

Related U.S. Application Data

(63) Continuation-in-part of application No. 17/245,184, filed on Apr. 30, 2021, now Pat. No. 11,850,527, which is a continuation-in-part of application No. 17/082,066, filed on Oct. 28, 2020, now abandoned.

(60) Provisional application No. 62/928,626, filed on Oct. 31, 2019.

(51) Int. Cl.

| | |
|---|---|
| ***G07F 17/32*** | (2006.01) |
| ***A63F 3/06*** | (2006.01) |
| ***A63F 3/08*** | (2006.01) |

(52) U.S. Cl.

CPC .......... *G07F 17/329* (2013.01); *A63F 3/0605* (2013.01); *A63F 3/064* (2013.01); *A63F 3/0645* (2013.01); *A63F 3/068* (2013.01); *A63F 3/081* (2013.01); *A63F 2003/088* (2013.01)

(58) Field of Classification Search

CPC ...... G07F 17/329; A63F 3/0605; A63F 3/064; A63F 3/0645; A63F 3/068; A63F 3/081; A63F 2003/088

See application file for complete search history.

(56) References Cited

U.S. PATENT DOCUMENTS

| | | | |
|---|---|---|---|
| 6,065,181 | A | 5/2000 | Cleveland et al. |
| 8,192,268 | B1 | 6/2012 | Karpe |
| 9,044,787 | B1 | 6/2015 | Stewart |
| 2007/0037499 | A1 | 2/2007 | Burbridge |
| 2020/0070563 | A1 | 3/2020 | Martineck, Sr. |

(Continued)

FOREIGN PATENT DOCUMENTS

| | | | |
|---|---|---|---|
| CN | 107808442 | B | 1/2020 |
| DE | 2601838 | A1 | 7/1977 |
| EP | 0414454 | A2 | 2/1991 |

(Continued)

*Primary Examiner* — Werner G Garner

(74) *Attorney, Agent, or Firm* — The Roy Gross Law Firm, LLC; Roy D. Gross

(57) ABSTRACT

The disclosure relates to devices, systems, methods and computer readable media for providing network management of remote card handling, and physical manipulation. More particularly, the disclosure is directed to networked devices, systems, methods and computer program methods for remotely, physically modifying a card while leaving a physical record of the modified card for inspection and validation and delivering the manipulation results to a user, and/or other third parties, for example, scratch lottery cards and ballot cards.

24 Claims, 17 Drawing Sheets

(56) References Cited

U.S. PATENT DOCUMENTS

2020/0226866 A1 7/2020 Heuman

FOREIGN PATENT DOCUMENTS

| | | | |
|---|---|---|---|
| JP | 2000334920 | A | 12/2000 |
| JP | 2004255745 | A | 9/2004 |
| KR | 102142246 | B1 | 8/2020 |

SYSTEMS, DEVICES AND METHODS FOR NETWORK MANAGEMENT OF REMOTE MODIFICATION OF CARDS

CROSS REFERENCE TO RELATED APPLICATIONS

This application is a Continuation-in-part of U.S. patent application Ser. No. 17/245,184, filed Apr. 30, 2021, which is a Continuation-in-part of U.S. patent application Ser. No. 17/082,066, filed Oct. 28, 2020, which claims the benefit of priority of U.S. Provisional Patent Application No. 62/928,626, filed Oct. 31, 2019, the contents of which are all incorporated herein by reference in their entirety.

COPYRIGHT NOTICE

A portion of the disclosure hereinbelow contains material that is card to copyright protection. The copyright owner has no objection to the reproduction by anyone of the patent document or the patent disclosure as it appears in the Patent and Trademark Office patent files or records, but otherwise reserves all copyright rights whatsoever.

COMPUTER PROGRAM LISTING APPENDIX

Applicant incorporates by reference the Computer Program Listing Appendix entitled "DBEST-001-US3-Appendix" into this application. This file was created on Nov. 6, 2023, and is 131 KB.

BACKGROUND

The disclosure is directed to devices, systems, methods, and computer-readable media for providing network management of remote cards' handling, and physical manipulation. More particularly, the disclosure is directed to networked devices, systems, methods, and computer programs for physically modifying cards such as, for example, scratch lottery cards and ballot cards.

Current interest in lottery games has resulted in a wide range of publicly promoted games conducted throughout the world. These games take several forms including the well-known scratch card games in which winning numbers are determined by scratching off a covering layer on cards to disclose the winning numbers.

In addition, online drawings and participation has increased the popularity of the whole lottery system to the point where, in certain circumstances, it is possible to buy a lottery subscription with either a random number selected each time, or the same number played at each drawing. Furthermore, regulations are highly variable concerning when and how scratch cards can be validated as winning.

Similarly, election law and security continuously require the combination of electronic voting for fast results, combined with the creation of paper-trail to provide traceability and prevent fraud.

The following disclosure intends to address these requirements.

SUMMARY

In one aspect, the invention relates to a networked device for remotely modifying physical cards, comprising: a) a first and a second card holders, the first of which is configured to store a plurality of unmodified cards, and the second of which is configured to receive and store physically modified cards, b) a first and a second card conveyors, configured to convey cards over a conveying platform, between said unmodified card holder and said modified card holder, c) a physical modification module (PMM), which is configured to displace a modifying member, for physically modifying an unmodified card conveyed therethrough over said conveying platform, by removing at least one portion thereof (e.g., while moving perpendicular to the conveying axis of the cards conveyed therethrough) d) an imaging module comprising one or more light modules and a camera (e.g., adapted with one or more charge-coupled devices (CCDs), a complimentary metal-oxide semiconductor (CMOS), or a combination thereof) configured to capture images of cards conveyed on said conveying platform, e) a cleaning module (e.g., a blower, a brush, a suction device), configured to remove physical modification residues from cards during and following their physical modification, and f) a central processing module (CPM) configured to be in communication with one or more controllers of said card holders, card conveyors, physical modification module, imagine module, cleaning module, and with a communication network, wherein said CPM is configured to receive remote requests for modifying one or more selected unmodified cards, to operate said first and a second card conveyors, PMM, imaging module, and cleaning module, for physically modifying the one or more selected unmodified cards, and to capture one or more images of unmodified and modified cards. The CPM may further analyze the one or more captured images and to submit the analysis to a remote computing device. The PMM may comprise adjustment means facilitating its adjustment to different pressure levels applied on a modified card, wherein the adjustable pressure levels enable the PMM to remove ink from the physical card or enable the PMM to remove a scratchable layer from the physical card. The one or more light modules may be configured to irradiate soft light, and optionally be positioned in an angle to prevent reflections from the illuminated cards. The plurality of unmodified cards may be chained to form a single roll (e.g., Z-roll), wherein each card is separated from an adjacent unmodified card by at least one of: a scoring perforation, a machine-readable marker, and a blank gap.

In another aspect the invention relates to a networked computerized card-modifying system, comprising: a) a plurality of networked card modifying terminals, each of which is a networked card modifying device according to claim 1, where he networked card modifying terminals may be configured to provide the analyzed modified card to a manual monitor, b) one or more networked client access terminals comprising: a display; a communication interface adapted for two-way communication with the communication network; a user interface adapted to provide user input; and a processor in communication with the display, configured to receive a user's request to physically modify one or more selected unmodified cards, transmit said request to a backend management server, receive an analysis of the physical modification of the one or more selected cards from said backend management server, and render the analysis results on the display, c) a card issuing entity, and d) a Backend Management Server (BMS) comprising: a management communication interface, adapted for two-way communication with the communication network; a first non-transitory storage device; and a backend processing module (BPM) in communication with each of said plurality of networked card modifying terminals, said one or more networked client access terminals, and said card issuing entity, whereby said BMS is configured to: i) receive one or more requests to physically modify one or more selected unmodified cards, from one or more of said one or more networked client access terminals, ii) locate a predetermined card modifying terminal of said plurality of card modifying terminals for each request, iii) transmit each of said requests to its predetermined card modifying terminal, iv) receive the unmodified card information and modified card analysis from each predetermined card modifying terminal associated to each request, and v) based on the analysis, inform the card issuing entity and the corresponding networked client access terminals. The BMS may be configured to locate a predetermined networked card modifying terminal with the shortest queue for each physical card modification of the unmodified card request and transmit physical card modification instructions to the located predetermined networked card modifying terminal. The predetermined networked card modifying terminal may be further configured to: a) capture an image of the analyzed physically modified card, b) determine if said analyzed card is a winning card, c) if said analyzed card is the winning card, provide the card for manual monitoring, and d) transmit the captured image to the originating networked client access terminal.

In yet another aspect, the invention relates to a method for remotely modifying physical cards, comprising: a) providing a networked device for remotely modifying physical cards according to claim 1, b) submitting a request to said networked device for modifying at least one selected unmodified card to said networked device, and c) operating said networked device to physically modify said at least one selected unmodified card, clean modification residues therefrom, and capture one or more images thereof.

In a further aspect, the invention relates to a method for remotely modifying physical cards in a multi-node network environment, comprising the steps of: a) providing a networked computerized card-modifying system according to claim 16, b) operating one or more networked client access terminals to submit one or more requests for physically modifying at least one selected unmodified card, c) receiving the submitted one or more requests by a BMS of said networked computerized card-modifying system, d) locating a predetermined card modifying terminal of a plurality of card modifying terminals for each of said one or more requests, e) transmitting each of said requests to its predetermined card modifying terminal, f) receiving unmodified card information and modified card analysis from each of said predetermined card modifying terminal associated to each of said requests, and g) based on the analysis, informing the card issuing entity, and the corresponding one or more networked client access terminals. The method may further comprise the steps of: a) capturing an image of the analyzed physically modified card, b) determining whether the analyzed card is a winning card, c) if said analyzed card is the winning card, providing the card for manual monitoring, and d) transmitting the captured image to the originating networked client access terminal. The card issuing entity is a lottery administrating agency. Step (d) of locating a predetermined card modifying terminal, the predetermined card modifying terminal may be determined as the card modifying terminal with the shortest queue for the selected unmodified card of the received request.

BRIEF DESCRIPTION OF THE FIGURES

For a better understanding of the devices, systems, methods and computer-readable media for remotely, and physically modifying a card while leaving the modified card intact in storage for further review and validation, reference is made to the accompanying examples and figures, in which.

DETAILED DESCRIPTION OF EMBODIMENTS OF THE INVENTION

Provided herein are embodiments of devices, systems, methods and, computer-readable media for remotely, and physically modifying a card while leaving the modified card intact in a secured storage for further review, inspection, and validation. More particularly, provided herein are embodiments of a system and methods of remotely, and physically modifying a card while leaving a record of the modified card for inspection and validation and delivering the manipulation results to a user, and/or other third parties.

Therefore, provided herein is a networked device for physically modifying a plurality paper (or other materials) cards (in other words, a slab or film having defined borders), comprising: a physical manipulation module (PMM) 300 (see e.g., FIG. 3A); an unmodified card holder 256*a* (see e.g., FIG. 2B); an unmodified card conveyor 254*a* (see e.g., FIG. 2B) a modified card holder 256*b* (see e.g., FIG. 2C); a modified card conveyor 254*b* (see e.g., FIG. 2D); an imaging module (see e.g., 400 FIG. 4B); a cleaning module comprising a blower 258 (see e.g., FIG. 2B) for preventing undesired accumulation of modified material flakes that may impair the mechanical operation of device 100; and a central processing module (CPM) (see e.g., 600 FIGS. 5, 6) in communication with the PMM 300, the unmodified card holder 256*a*, the unmodified card conveyor 254*a*, the cleaning module with blower 258, the modified card holder 256*b* the modified card conveyor 254*b*, and the imaging module 400. The CPM may further comprise: a transceiver 506 (see e.g., FIG. 5) in communication with a communication network; and at least one processor in communication with a non-transitory and non-transient storage device having thereon a processor-readable medium with a set of executable instructions configured, when executed, to cause the at least one processor to: receive a request for modifying at least one unmodified card; using the unmodified card conveyor, convey the unmodified card from the unmodified card holder to the PMM 300; physically manipulate the card; analyze the modified used card using imaging module 400; transmit the analysis using transceiver 506; and convey the used card to the used cards holder.

Figure 8:
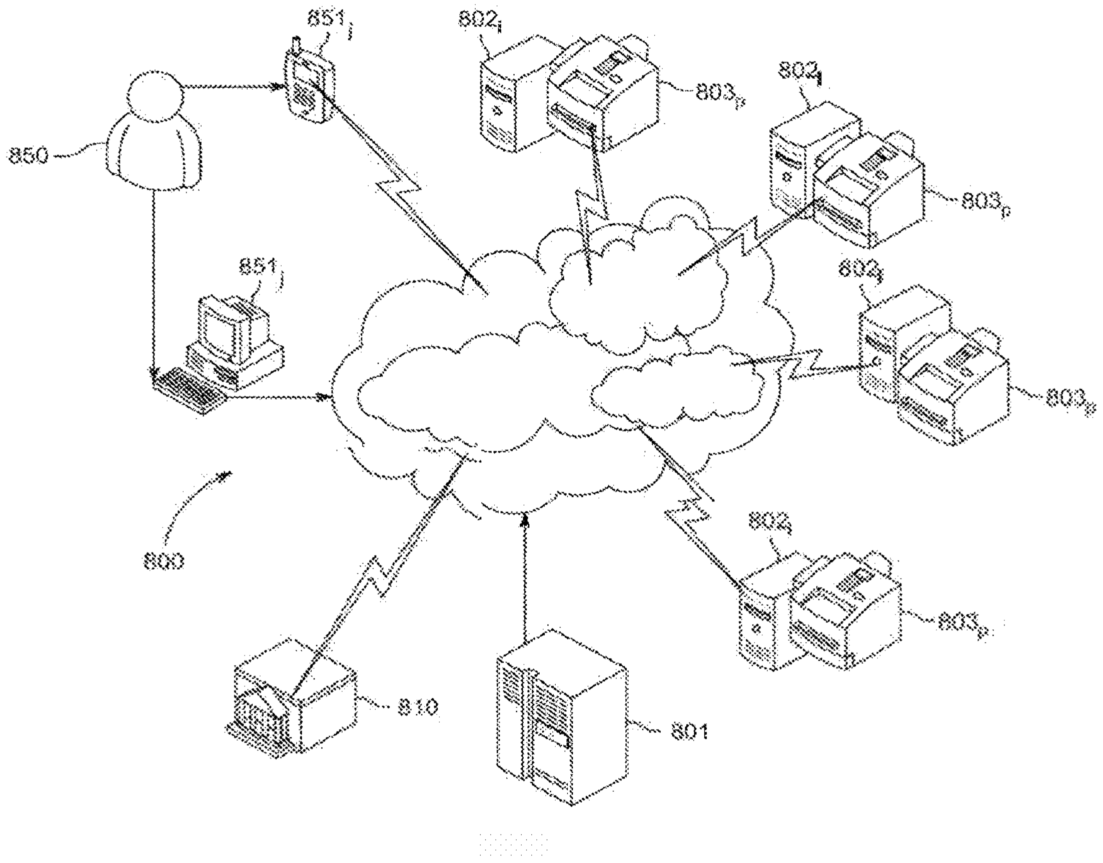
FIG. 8 illustrates an exemplary system diagram of a computerized networked system for remote modification of physical cards, according to an embodiment of the present invention.

The device is a computerized networked device forming a node for a multi-node networked computerized card-modifying system (further illustrated and explained in reference to the system diagram of FIG. 8), comprising: a plurality of computerized card modifying terminals 802*i* (FIG. 8), each terminal comprising: a physical manipulation module (PMM) 300; an unmodified card holder 256*a*; an unmodified card conveyor 254*a*; a modified card holder 256*b*; a modified card conveyor 254*b*; an imaging module 400; a cleaning module comprising blower 258; and a central processing module (CPM) in communication with the PMM 300, the unmodified card holder, the unmodified card conveyor, the cleaning module, the modified card holder the modified card conveyor, and the imaging module, where the CPM further comprising: a transceiver 506 in communication with a communication network; and at least one processor in communication with a non-transitory storage device having thereon a processor-readable medium with a set of executable instructions configured, when executed, to cause the at least one processor to: receive a request for modifying at least one unmodified card; using the unmodified card conveyor, convey the unmodified card from the unmodified card holder to the PMM; physically manipulate the card; analyze the modified used card; transmit the analysis; and convey the used card to the used cards holder a client terminal comprising: a display; a communication interface, adapted for two-way communication with the communication network; a user interface, adapted to provide the user input; and a processor, in communication with the display, the communication interface, and the user interface, the processor being in communication with a non-transitory storage device having thereon a processor-readable medium with an application program interface configured, when executed, to cause the processor to: receive input from the user configured to select a card to be remotely physically modified; transmit the selected card to a backend management server; receive an analysis of the physical manipulation of the selected card; and render the analysis results on the display; the unmodified card issuing entity; and a backend management server comprising: a management communication interface, adapted for two-way communication with the communication network; a first non-transitory storage device; and a backend processing module (BPM) in communication with each card modifying terminal, the client terminal, and the unmodified card-issuing entity, the BPM further comprising at least one backend processor in communication with a non-transitory storage device having thereon a processor-readable medium with a set of executable instructions configured, when executed, to cause the at least one processor to: receive the unmodified/unused card selection from the user terminal; locate a predetermined card modifying terminal; transmit the selection to the predetermined card modifying terminal; receive the analysis transmittal from the predetermined card modifying terminal; and based on the analysis, inform the card issuing entity.

It should be readily understood by a person skilled in the art that any portion or the entirety of operational data and of information acquired during the operation of device 100, may either be processed/analyzed/stored locally, by one or more specific controllers of components of device 100 (e.g., camera 406 of imaging module 400), or by CPM 600, or remotely (e.g., by a designated computer, mobile device, server, distributed computing system, etc.).

The term “system” shall also be taken to include any collection of systems or sub-systems that individually or jointly execute a set, or multiple sets, of instructions to perform one or more functions. Also, the term “system” refers to a logical assembly arrangement of multiple devices and is not restricted to an arrangement wherein all of the component devices are in the same housing.

In the context of the disclosure, the term “modified” and/or “physically modified” refers to (and derivatives thereof) of a card refers to any re-shaping, perforating, removal of a portion of the card, erasing ink therefrom, adding marking thereto, forming indentations therein, and the like, whether accomplished with springs, friction, dampeners elements, pins, printing, hole punchers, or other structures, devices, means or methods. As such, modifying such a card may be accomplished by frictional effects, spring mechanisms, dampener mechanisms, servo motors, pneumatic actuators, other devices (and their equivalents) described herein, and any combination of these. Further, the term “card” in the context of the disclosure refers to any flat slab or film sized, configured and adapted to deliver a commercial, public, or commercial message, such as, for example, a lottery scratch card, ticket, photograph, compact disc, bank note, check, greeting card, gift card, election ballot and the like. Additionally, the term “card” should be understood to include any suitable materials, including stiff and flexible materials whether fabricated from paper, cardboard, plastic material, metal, or otherwise. In an embodiment, the unused/unmodified card is at least one of: a scratch-lottery card (SLC), and an election ballot card (EBC).

Following the modification of the card using the systems, devices, method, and computer programs described herein, there may be the need to further treat the cards, for example by cleaning the face of the card from any remnants of the modification. These can be, for example, any ink or card portion removed by punching, erasing, cutting and the like of the card. Accordingly, and in another embodiment, the set of executable instructions are further configured, when executed, to cause the at least one processor in the card modifying terminals to: prior to analyzing the modified used card, using the used cards conveyor, conveying the used card to the cleaning module; and cleaning the modified used card. In the context of the disclosure, an unmodified/unused card refers to the card before any modification, while a modified/used card refers to the card after the remote physical modification.

Figure 1:
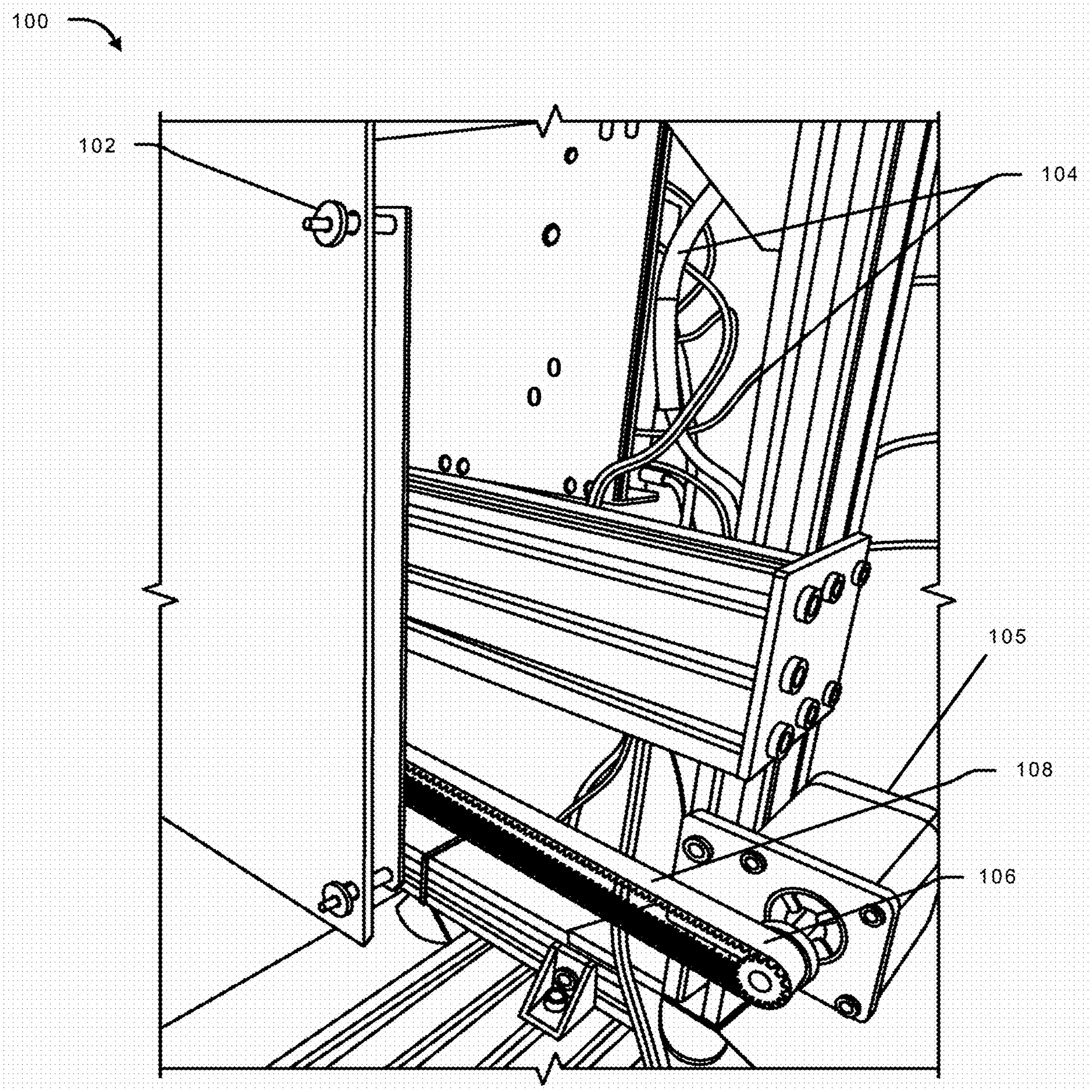
FIG. 1 illustrates an exemplary computerized networked device for remote modification of physical cards, according to an embodiment of the present invention.

FIG. 1 illustrates an exemplary computerized networked remote manipulation device 100 (also interchangeably referred to as "networked device" hereinafter) in accordance with an exemplary implementation. In an exemplary implementation, the proposed networked device 100 can be configured to, based on instructions received from a remote computing device, physically modify one or more physical cards (e.g., scratch-lottery card (SLC) and election ballot cards (EBC)) that are received by said device 100, and particularly perform modification of the received physical card(s) based on instructions received from the remote computing device. It would be appreciated that at the time when a physical card (also simply referred to as card or card(s) hereinafter) is first received by the proposed networked device 100, said card would be referred to as an "unmodified card", and upon receipt of the instructions from the remote computing device, when the proposed device 100 modifies the unmodified card, it would be referred to as a "modified card".

Figure 6:
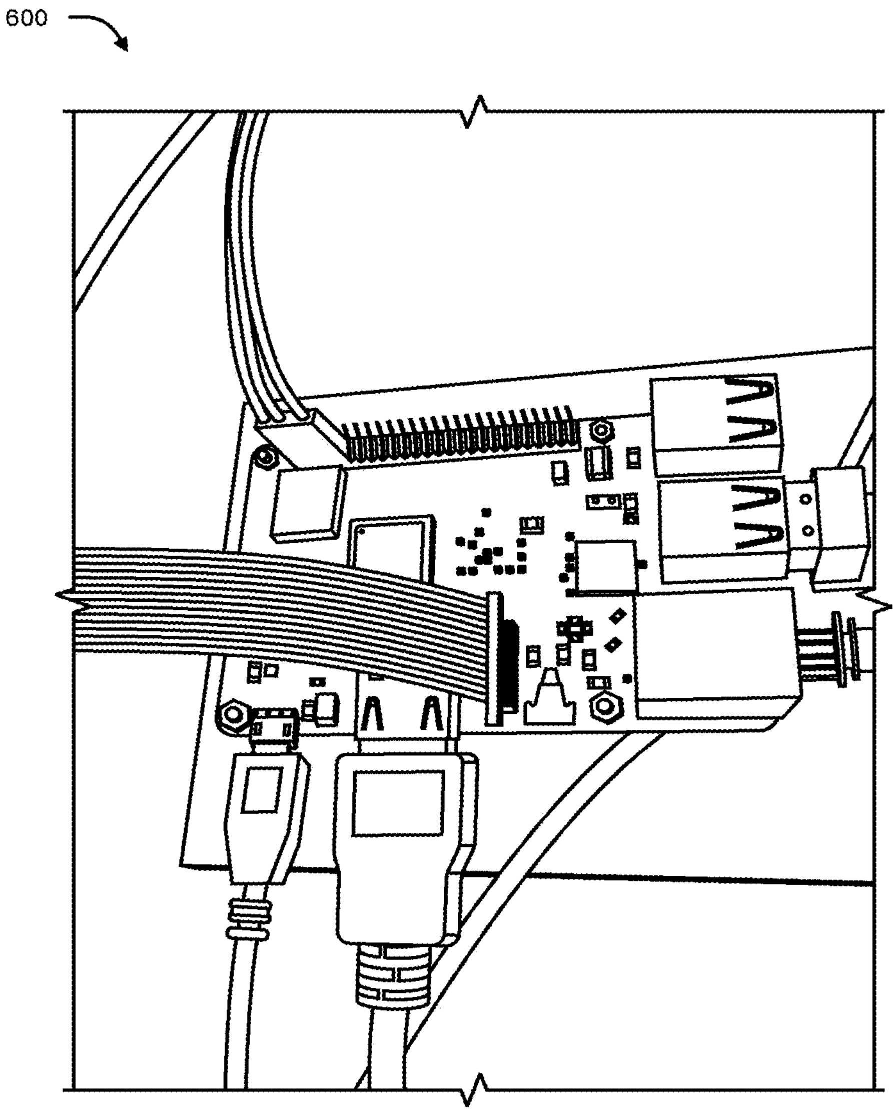
FIG. 6 illustrates an exemplary central processing module (CPM) of a computerized networked device for remote modification of physical cards, according to an embodiment of the present invention.

In an aspect, the proposed networked device 100 can include one or more components (some of which are not shown in FIG. 1 but are included herein for the sake of an inclusive illustration with indication of references to the corresponding FIGs.) selected from any or a combination of a physical modification module (PMM) (300 of FIG. 3A), a first cards holder (200 of FIG. 2A) that stores a determined number of unmodified cards (see unmodified cards holder 256*a* of FIGS. 2B-2C), a first card conveyor employing (see FIG. 2A) a suitable arrangement of a motor 105, a drive shaft 106 thereof, and a belt 108 for retrieving unmodified cards from the unmodified cards holder 256*a* (see unmodified cards conveyor 254*a* of FIG. 2B-2); a second card holder 200 utilized as a modified card holder 256*b* (FIG. 2C) that stores modified cards for later handling; a second card conveyor for conveying modified cards (e.g., modified cards conveyor 254*b* of FIG. 2C interchangeable with a rotatable transfer drum), an imaging module (400 of FIG. 4), a cleaning module comprising a blower 258 (see FIG. 2B), and a central processing module (CPM) (600 of FIG. 6). The proposed networked device 100 can be constructed using materials such as steel, aluminum, and the like or a combination thereof. Components of the proposed networked device 100 can be fixed/coupled with each other using screws and/or bolts 102. In an aspect, the proposed networked device 100 can include one or more cables 104 that can be incorporated within the device 100, to enable communication between various components. In an aspect, the proposed networked device 100 may utilize one or more electric motors such as motor 105 of FIG. 2A (e.g., servo motors, step motors) adapted with a cogged belt shaft 106, on which a cogged belt 108 is mounted such as for driving conveyors 256*a* and 256*b* to convey the unmodified cards 248*i* and such that upon processing of said unmodified cards 248*i* by the proposed device 100, the modified cards 248'*i*.

Figure 3A:
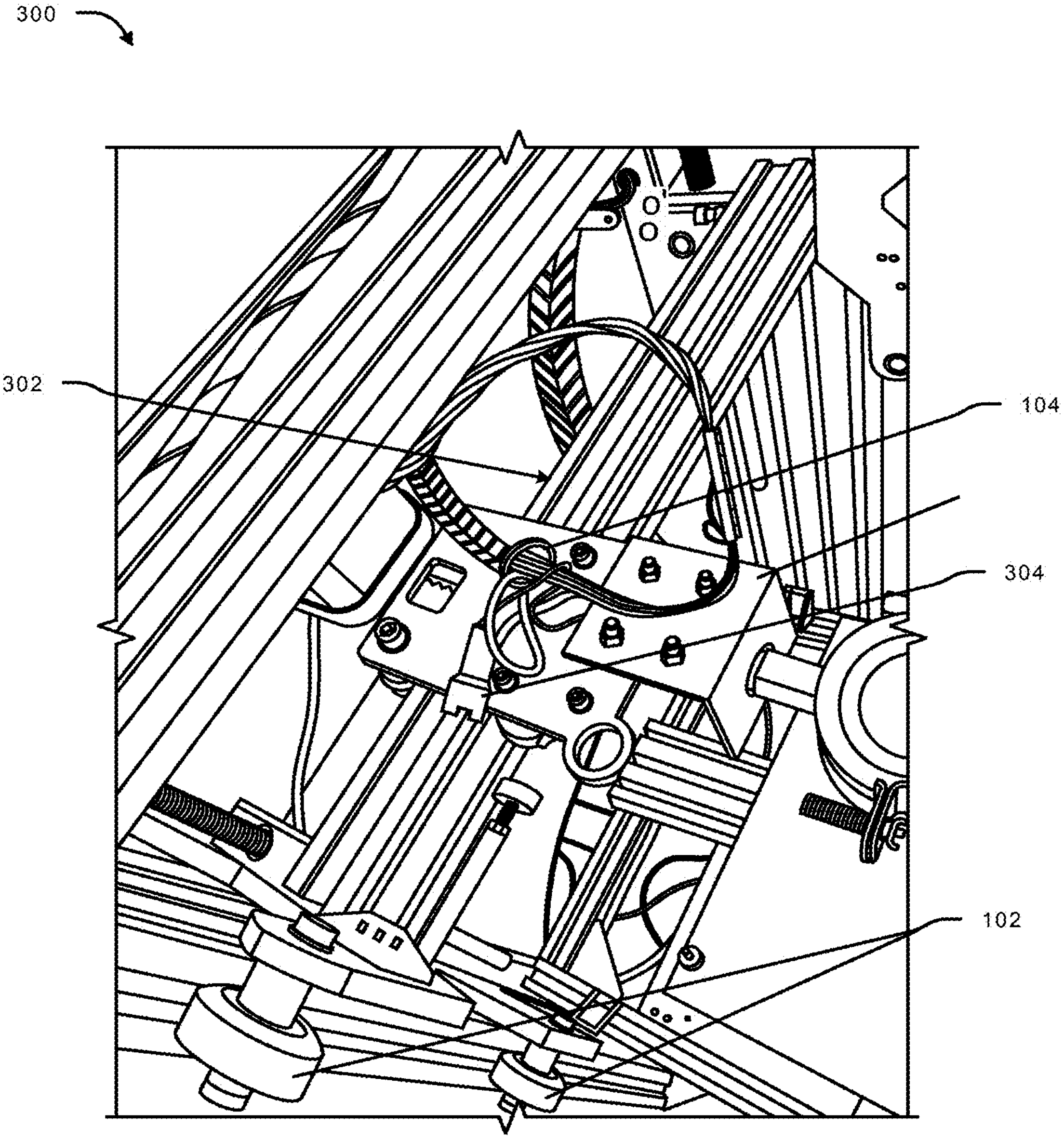
FIG. 3A illustrates an exemplary physical modification module of a computerized networked device for remote modification of physical cards, according to an embodiment of the present invention.
Figure 4A:
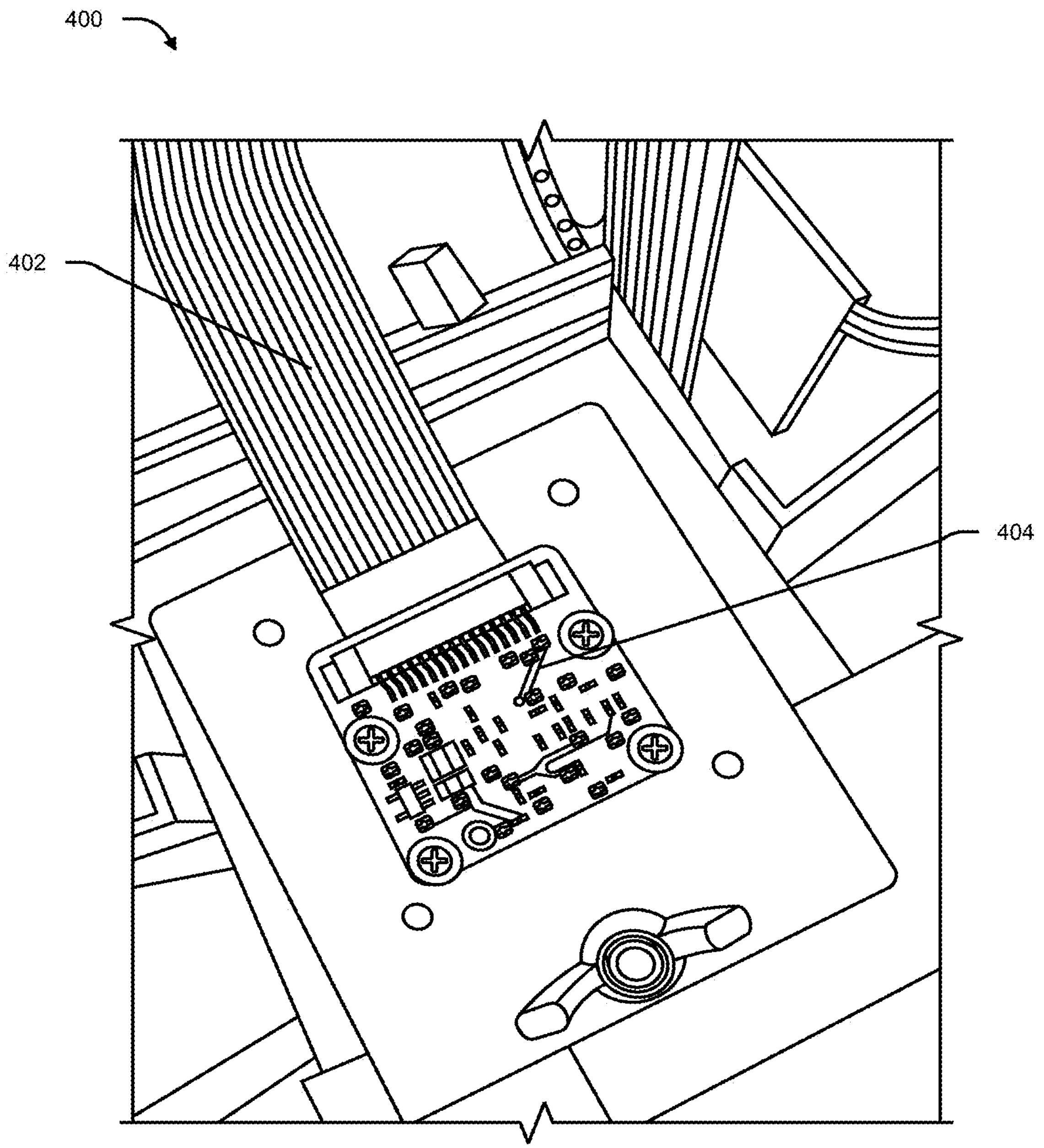
FIGS. 4A and 4B illustrate exemplary representations of an imaging module of a computerized networked device for remote modification of physical cards, according to an embodiment of the present invention.

In an aspect, networked device 100 can be configured to, based on instructions received from a remote computing device, physically modify one or more cards, wherein the device 100 can include a central processing module (CPM) (600 of FIG. 6) that can assist and facilitate communication with the PMM (300 of FIG. 3A), the card holders 256*a* and 256*b*, the card conveyors 254*a* and 256*b*, the cleaning module comprising blower 258, and the imaging module (400 of FIG. 4A). The CPM (600) can further include a transceiver 506 (see e.g., FIG. 5), in communication with/through a network, and can further include at least one processor that is in communication with a non-transitory storage device. The storage device can further include a processor-readable medium with a set of executable instructions so as to enable the processor to receive a request (for instance, from the remote computing device as explained in detail hereinbelow and specifically in reference to FIGS. 7A, 7B, 7C, and 8) for modifying at least one unmodified physical card. Based on such a received request, the unmodified card can be conveyed from the unmodified card holder (256*a* of FIGS. 2B-2C) using the unmodified card conveyor 254*a* to the PMM (300 of FIG. 3A). The PMM (300 of FIG. 3A) can, in turn, physically modify the unmodified card 248*i* based on the instructions received from the CPM (600) and analyze the modified card. Such analysis can include, but is not limited to, detection of the presence of physical manipulation of/on the selected card, analysis of the modified used card, and examination of the scratched lottery card. In an exemplary aspect, PMM (300 of FIG. 3A) can be configured to transmit the analysis to the CPM (600), along with delivering the modified card to the modified card holder 256*b* using the modified card conveyor 254*b* (of FIG. 2A).

In an aspect, before undertaking the modification process, PMM (300 of FIG. 3A) can be configured to remove a portion present in/on the unmodified card 248*i* in X-Y direction. In another aspect, PMM (300 of FIG. 3A) of the proposed networked device 100 can be configured to modify the physical card by removing ink that may be present on at least one predetermined location of the physical card. The ink removal operation may be performed by applying predetermined pressure on the card (e.g., by a modifying member 304 of FIG. 3A) which exerts removal of determined ink markings at desired locations of the card being modified. The ink removal patterns, locations, and required pressure levels suitable for specific combinations of card types (e.g., card material, thickness, and dimensions) and ink types applied thereon (e.g., composition and quantity) may be predetermined in suitable configuration files stored by the central processing module (CPM) (600 of FIG. 6) and/or included in the modification instructions submitted to the central processing module (CPM) (600 of FIG. 6) through transceiver 506 (see e.g., FIG. 5).

In an aspect, the proposed network device 100 can include an imaging module (400 of FIG. 4B) along with a camera (406 of FIG. 4B) so as to capture and process images of the physical card. In an embodiment, the proposed imaging module (400 of FIG. 4A) can include one or more charge coupled devices (CCDs), a complimentary metal-oxide semiconductor (CMOS), and/or a combination comprising one or more of the foregoing. In aspect, the proposed networked device 100 can relate to a motion-adaptive platform that can enable modification of the physical card through automated image quality analysis of the captured image(s).

Figure 2A:
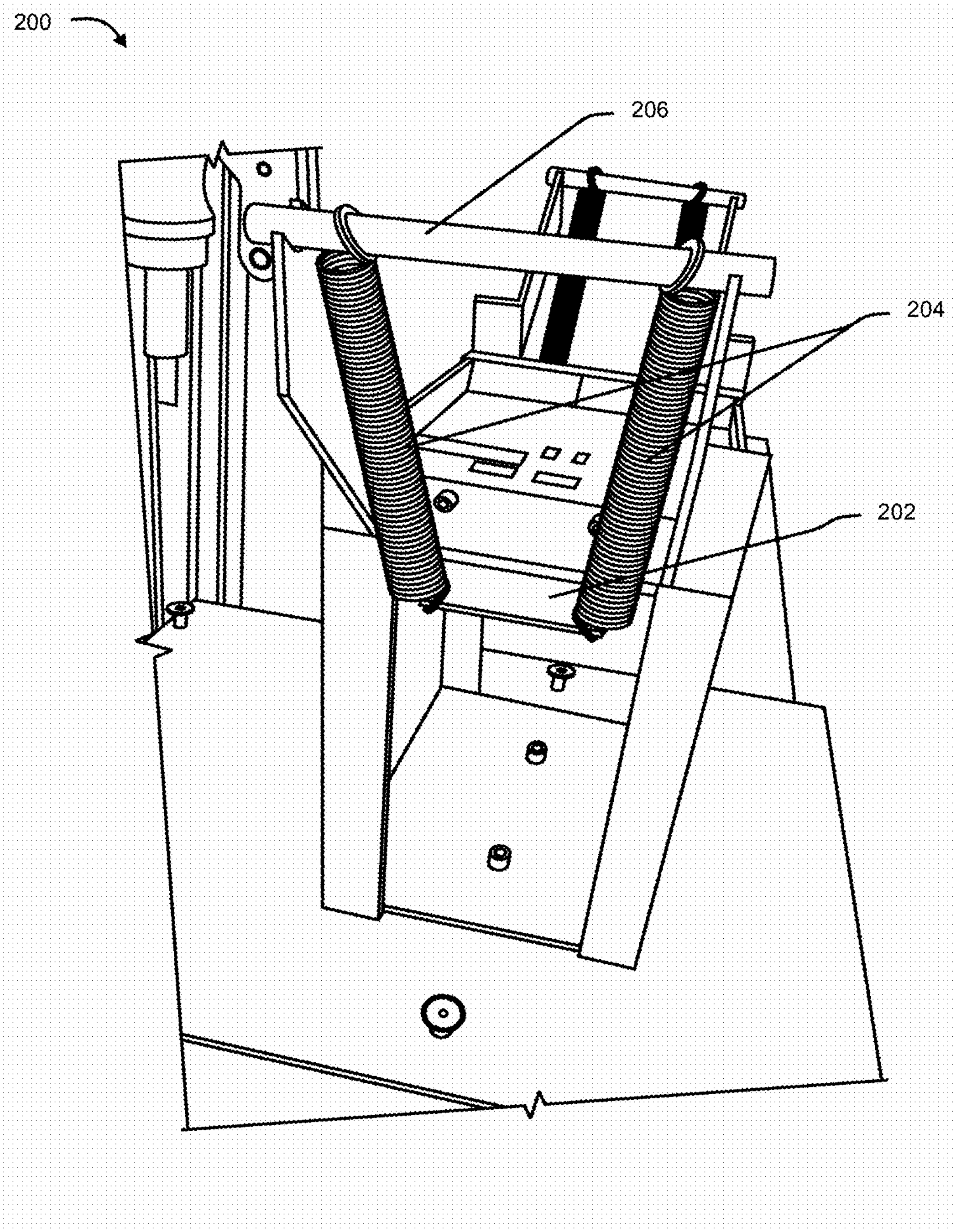
FIG. 2A shows an exemplary card holder of a computerized networked device for remote modification of physical cards, according to an embodiment of the present invention.

FIG. 2A illustrates an exemplary card holder 200 of the proposed networked device 100 in accordance with an exemplary implementation. In an exemplary implementation, card holder 200 may be used as an unmodified card holder 256*a*. Card holder 200 may include a slot 202 to receive one or more physical cards, a pair of springs 204, and a rod 206 passing through a portion of said pair of springs. In an exemplary aspect therefore, one end of each of the springs 204 can be coupled to the slot 202, while the other end is coupled to the rod 206. In an exemplary implementation, the unmodified card holder 256*a* can be configured to receive a request from the central processing module (CPM) (600 of FIG. 6) for modifying at least one unmodified card using the unmodified card conveyor, based on which the said request can be transmitted from the unmodified card holder 256*a* to the PMM 300.

Figure 2B:
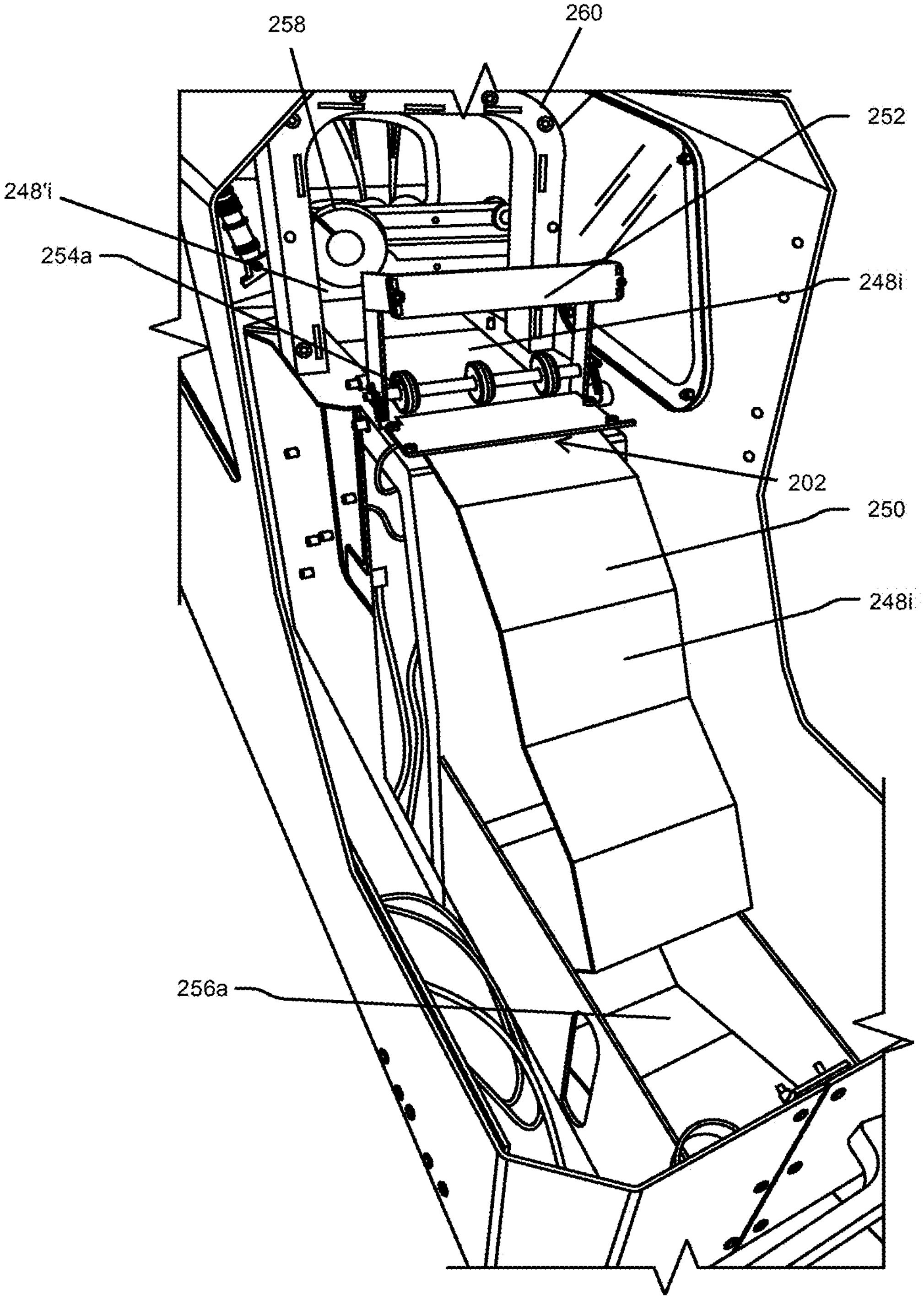
FIG. 2B shows another exemplary card holder of a computerized networked device for remote modification of physical cards, according to an embodiment of the present invention.

In another exemplary implementation, and as illustrated schematically in FIG. 2B, the unmodified cards 248*i* can be provided on a roll of cards 250, and card holder 200 (i.e., being used as an unmodified card holder 256*a*) can be operable to draw the scored (perforated) roll 250 (or otherwise indexed through rotatable transfer drum 254*a* indexing using, for example, an encoder, or marked with machine-readable marking etc.) in an indexed manner to present the indexed section of the roll 250 to PMM 300 for further processing. Accordingly and in another exemplary implementation, provided herein is a transversely scored roll of chained cards 250 (unmodified to start and modified in the end) adapted to be fed to PMM 300 for the purpose of transferring cards to be manipulated (lottery, election ballots) thereto from an unmodified card roll without concern that such transfer will be imperfect, or will leave voids adjacent the score lines as the card roll moves through the networked device 100. In other words, the individual cards, or a plurality of cards, can be Z-folded at a certain stage in the transfer between the unmodified and modified cards holder(s). In the context of the disclosure, the term Z-fold, as well as the card configuration within the roll, means any configuration in which the region of connection between successive cards alternates between two different regions removed from each other such that the first region serves as the trailing portion of a first card and a leading portion of a second card and the second region serves as the trailing portion of the second card and the leading portion of the third card and so on.

As illustrated, the pre-scored (or otherwise separated or indexed), card roll (250 of FIG. 2B) is shown being fed from the roll (250 of FIG. 2B) through device 100 which includes rotatably mounted transfer drum 254*a*. Card roll (250) can be located in the unmodified card holder 256*a* that comprises unmodified cards 248*i* that are transferred from the roll 250 to the PMM 300 of device 100 for the purpose of permitting the physical manipulation (e.g., the physical scratch-off) and then under the imaging/scanning module 400 to capture an image of the manipulated card. As the pre-scored/indexed/marked/gapped roll 250 is then discharged from the imaging/scanning module 400, it can be rolled up at that time to form the Z-folding as shown. The number of cards in a Z-fold can be controlled by the length of the modified cards holder 256*a*.

Further shown in FIG. 2B are a light module 252 that provides illumination of unmodified/modified cards 248*i* and 248'*i* (correspondingly), and an imagine module bridge 260, that provides support to imaging module and specifically to a camera 406, as further illustrated and explained in the following FIG. 2C.

Figure 2C:
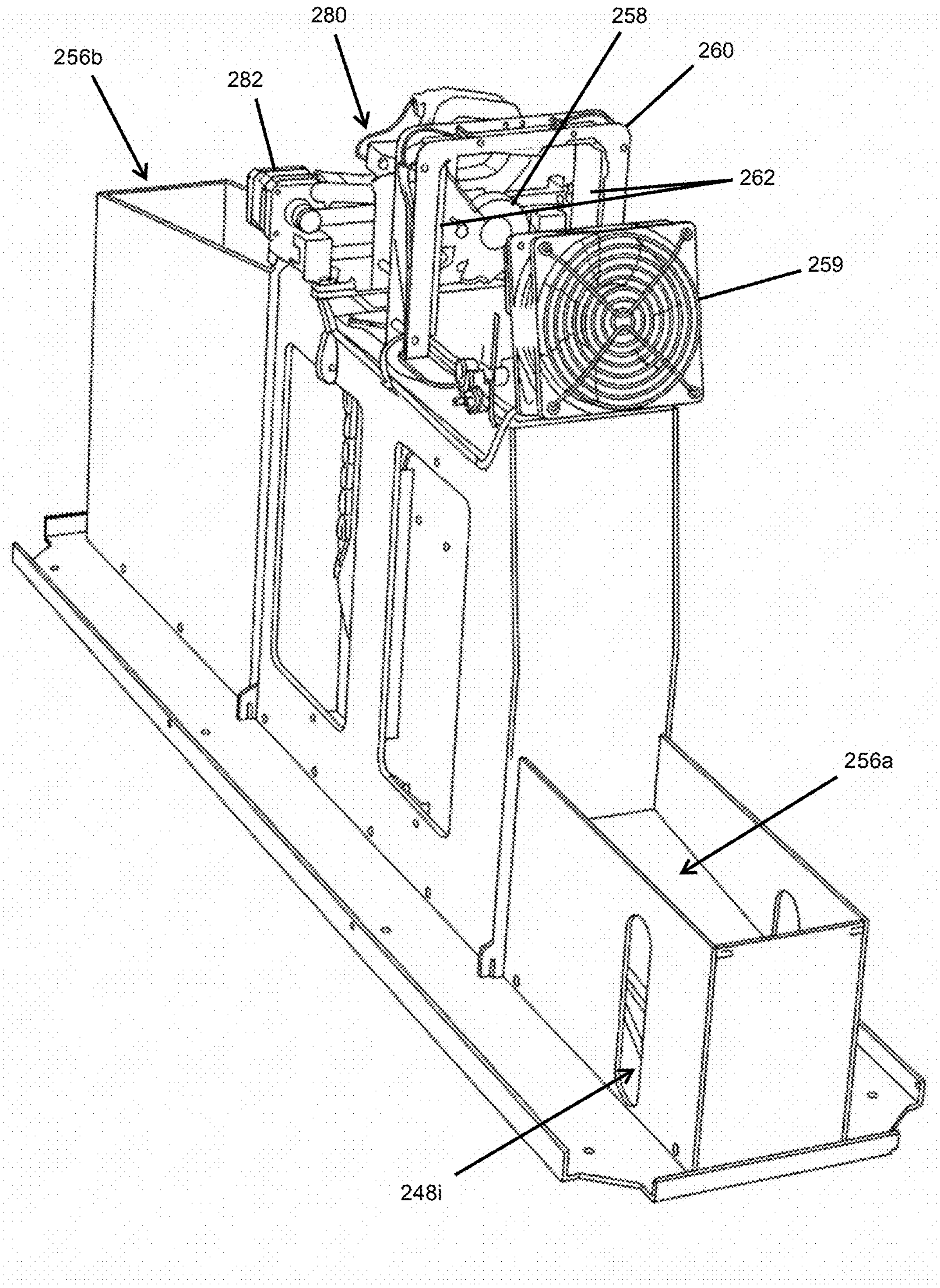
FIG. 2C shows another embodiment of a computerized networked device for remote modification of physical cards, according to an embodiment of the present invention.

FIG. 2C shows a perspective view of device 100, wherein further to blower 258, a larger blower 259 is shown. Blower 258 is next to the modification member 304, and hence capable of removing removed material residues formed during the modification action. For instance, where modification member 304 is scratching a scratch card, flakes of the scratched material may accumulate between moving parts and impair their functioning or its accuracy. Furthermore, since the larger blower 259 is directed to the conveying platform under the imaging module bridge 260, it is directed to remove the abovementioned flakes from a modified card 248'*i* before imaging module 400 captures an image thereof, thus, facilitating clear images to be captured.

According to certain embodiments of the present invention, the cleaning module may comprise one or more cleaning means such as sweeping brushes, suction devices, or the like for disposing undesired modifications residues, to enable uninterrupted operation of moving members of device 100, and the capturing of clear images of modified cards 248'*i*. The cleaning module may further comprise a collection container for receiving the collected residues.

According to certain embodiments of the present invention, in a common use, the CPM 600 is configured to operate device 100 as follows:

- Receive a remote request to modify one or more cards through transceiver 506;
- Convey roll 250 towards PMM 300 by operating card conveyors 254*a* and 254*b;*
- Capture an image of the one or more unmodified cards 248*i;*
- Modify the one or more unmodified cards, while activating blower 258;
- Convey the one or more unmodified cards backwards—towards the larger blower 259 and activate the same;
- Capture an image of the one or more modified cards 248'*i;*
- Convey the modified cards into the modified card holder 256*b*; and
- Submit captured images to a determined remote computing device.

Further shown in FIG. 2C is an imagine module bridge 260 with illumination modules 262, that may be used in lieu or in conjunction with light module 252 (of FIG. 2B). The light modules used in device 100 are suitable to provide sufficient illumination of the unmodified/modified cards being photographed by imagine module 400, while soft enough and evenly distributed, to facilitate a clear image captured, without reflections, of both matte and bright printed cards. The abovementioned soft illumination may be obtained by using partially transparent/non-transparent covers and/or filters, and/or by pre-positioning the light modules in a predetermined angle with respect to the scanned cards and with respect to conveying platform 302. Furthermore, designated light modules that are predesigned to reduce reflections may also be used to obtain the suitable illumination of the cards.

Further shown in FIG. 2C is a Physical Modification Module PMM 280 (interchangeable with PMM 300) which utilizes a step motor 282 for precisely moving a carriage (shown in FIGS. 3B and 4C) which carries a modifying member (e.g., modifying member 304 of FIG. 3A) in the X-Y direction (i.e., perpendicular to the conveying axis of cards roll 250) over a card being modified thereby.

Figure 2D:
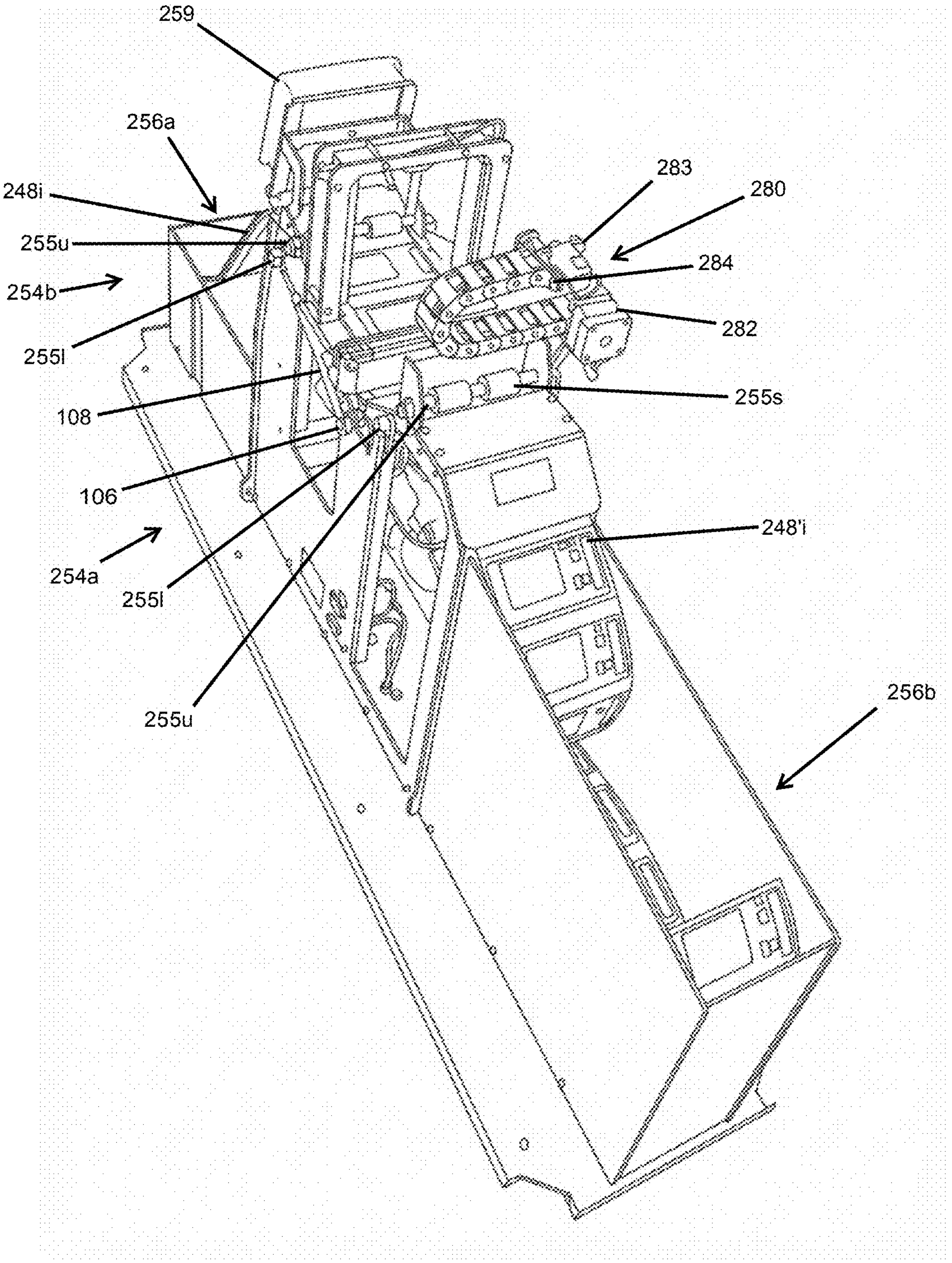
FIG. 2D shows an opposed view of the embodiment of FIG. 2C.

FIG. 2D is an opposed perspective view of device 100 of FIG. 2C, showing a more detailed view of unmodified/modified card conveyors 254*a* and 254*b* (correspondingly), each of which comprises an upper conveyor shaft 255*u* and a lower conveyor shaft 2551, where the lower conveyor shafts 2551 are driven by a cogged belt 108 belt mounted onto a cogged drive shaft 106 of a step motor 105. The step motors 282 (of PMM 280 or PMM 300) and 105 enable a precise displacement of unmodified cards 248*i* with respect to modifying member 304, and a precise displacement of modifying member 304 in the X-Y axis, thereby enabling a precise modification of the unmodified cards 248*i* in accordance with multiple different modification schemes of different cards. The lower and upper conveyor shafts arrangement includes a spring-loaded adjustment therebetween for enabling adaption of the pressure therebetween to different types of cards, where elastic shaft coating 255*s* (e.g., rubber, silicone) are utilized for providing sufficient friction between conveyors 254*a* and 254*b*, and the conveyed cards thereby.

Further shown in FIG. 2D are step motor 282 of PMM 280 (or interchangeably PMM 300), a servo motor 283 which is used for lifting or placing the from the conveying platform 302 (further illustrated in FIGS. 3A-3B) and a wiring caterpillar sleeve 284 for maintaining a secured and uninterrupted connection of the power supply and controls wiring of modifying member 304 along its X-Y displacement.

Figure 2E:
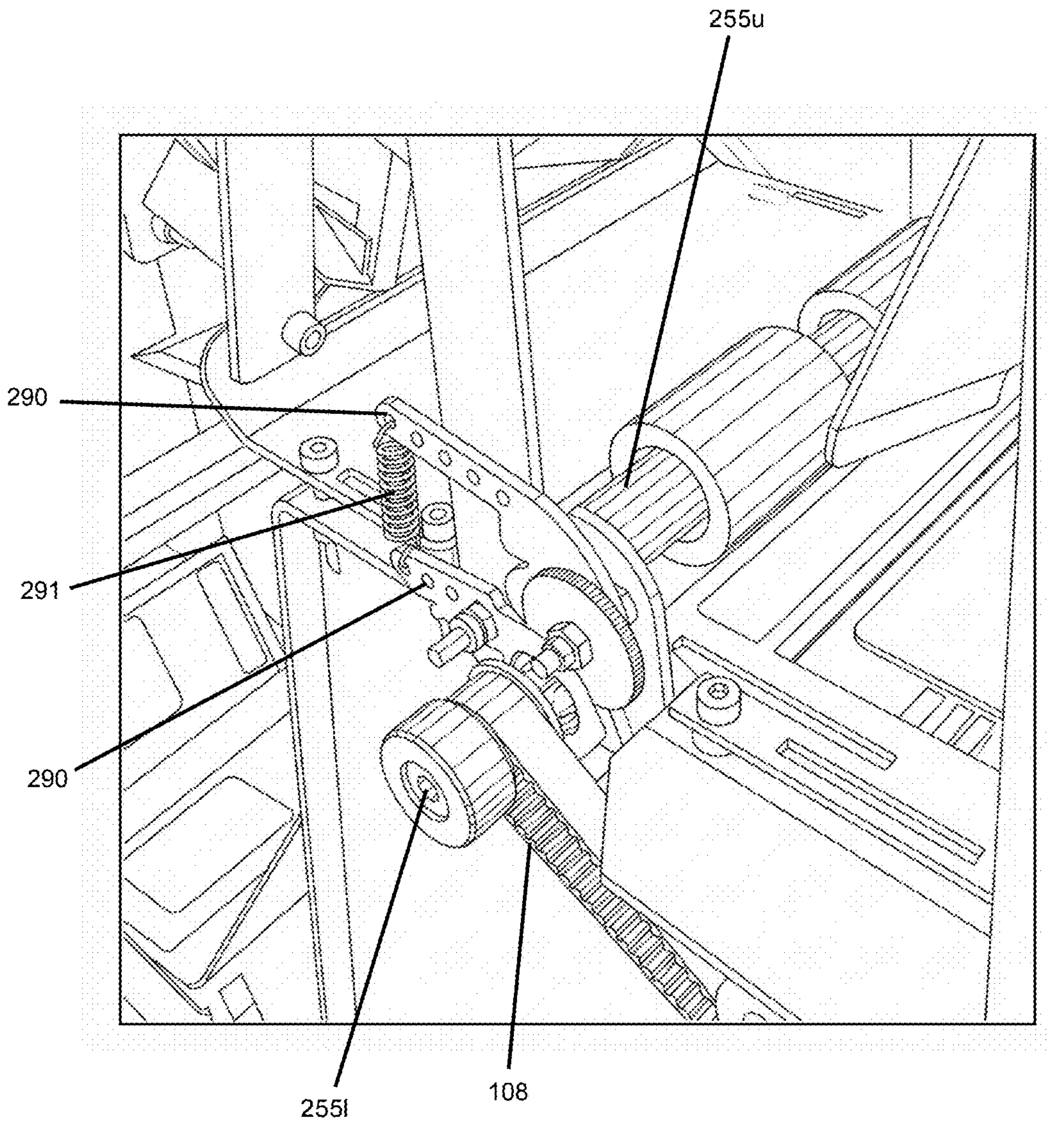
FIG. 2E shows an exemplary adjustment arrangement of the card conveyors of a computerized networked device for remote modification of physical cards, according to an embodiment of the present invention.

FIG. 2E shows an exemplary adjustment arrangement of the card conveyors, in which top and bottom arms 290 clamps upper and lower shafts 255*u* and 2551, where the clamping load is determined by the mounting locations thereon of a spring 291. The adjusted clamping load of arms 290 determines the pressure between upper and lower shafts 255*u* and 255*l*. It can be understood that the lower shafts are driven by the cogged driving belt 108 which is driven by a corresponding step motor 105.

FIG. 3A illustrates an exemplary physical modification module (PMM) 300 of the proposed networked device 100 in accordance with an exemplary implementation. In an exemplary implementation, the PMM 300 can be operatively coupled with a conveying platform 302 and a modifying member 304, said modifying member 304 being configured to receive, over the conveying platform 302 (which, in an exemplary implementation, can be the unmodified card conveyor), an unmodified card 248*i*, and physically process/modify said card to convert the same into a modified card 248'*i*.

In an exemplary aspect, modifying member 304 of the PMM 300 can be configured to, at its distal end, remove a portion of the unmodified/unused card 248*i* that is received over the conveying platform 302. The conveying platform 302 can be configured to move at least one of the modifying member 304, distal end of the modifying member 304, and/or the unmodified card in X-Y direction. As illustrated in FIG. 3A, PMM 300 can enable/control movement of the modifying member 304 (e.g., distal end of an arm of the member 304 or an elongated member of the member 304 that is adapted and configured to re-shape, perforate, or remove the desired portion of the unmodified card by, for instance, forming/creating opening(s), hole(s), indentation (s), embossed mark(s), etc, in/on the unmodified card at a predetermined location(s)), erase ink therefrom (in other words, remove ink at a predetermined location(s) on the card(s) face(s)), add marking(s) thereto, form indentation(s) therein, and the like) by a change in X-Y orientation of the member 304 with respect to the card through short or long steps. Such steps can be controlled by the main processor (see e.g., FIG. 6) and optimized to produce maximum efficiency in modifying (e.g., scratching) the card in the shortest time.

Figure 3B:
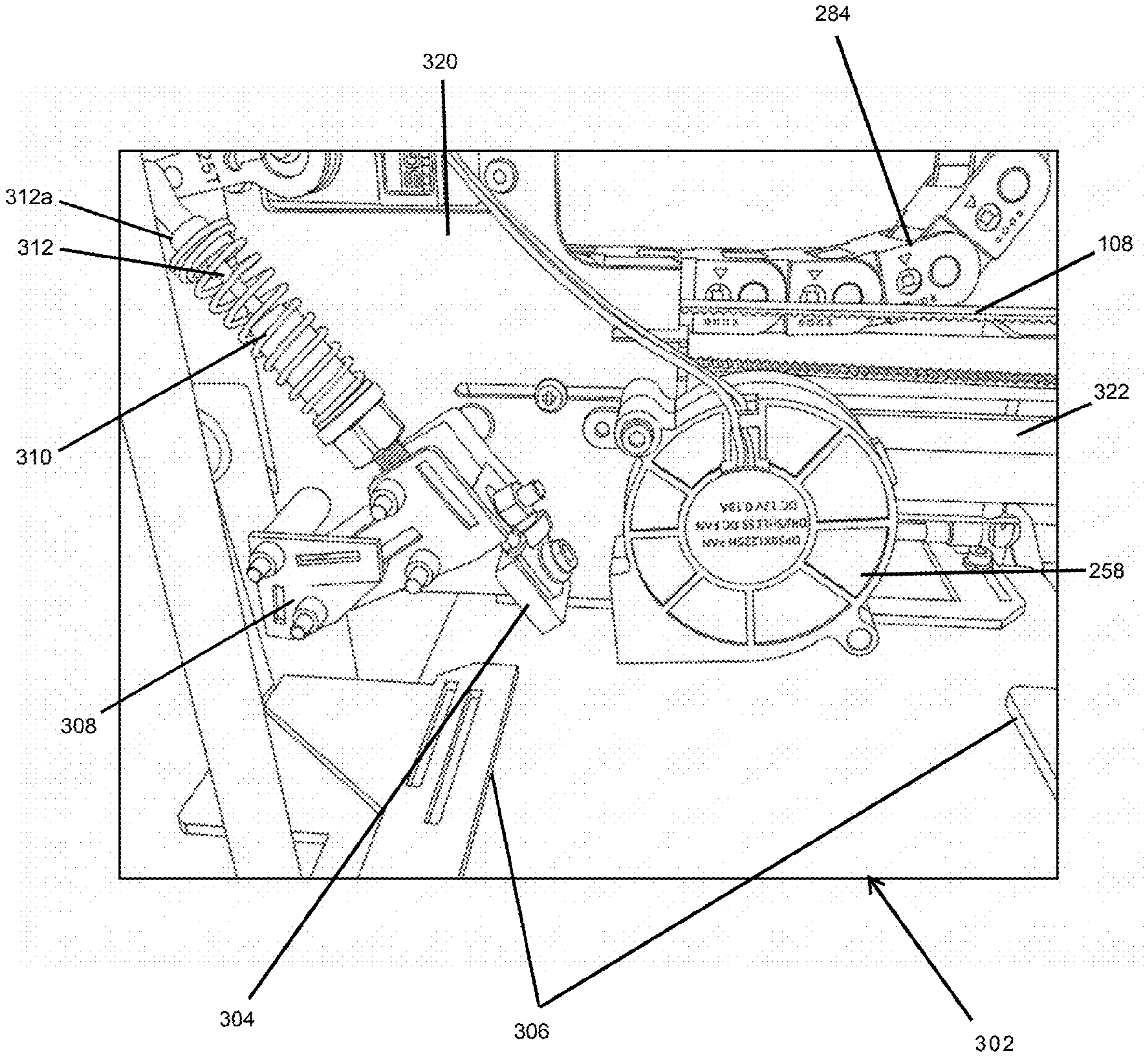
FIG. 3B is an enlarged view of an exemplary physical modification module of a computerized networked device for remote modification of physical cards, according to an embodiment of the present invention.

FIG. 3B illustrates an enlarged view of an exemplary configuration of PMM 300, where the modifying member 304 is mounted through adjustment clips arrangement 308 onto a spring-loaded-piston arm comprising a spring 310 and an adjustable piston 312 (e.g., by an adjustment nut 312*a*). Adjustment clips arrangement 308 and the adjustable spring-loaded-piston arm facilitate an accurate adjustment of the modifying member 304 to apply a desired pressure on the card being modified, according to the desired modification performed thereon. For instance, a certain pressure is required for scratching a removable coating layer off from a scratch-lottery card while a higher pressure may be required to remove applied ink therefrom. Of course, in the case of a scratch-lottery card excessive pressure is undesired since it may impair the ink underneath the removable coating, and hence, the card's validity. Further shown in FIG. 3B is modifying member carriage 320 onto which modifying member 304 and its adjustment arrangement are mounted, where carriage 320 is configured to travel with modifying member 304 on an X-Y guiding rail 322 for accurately displacing modifying member 304 for a desired modification of cards. Also shown in FIG. 3B is the conveying platform 302 on which card roll 250 of modified and unmodified cards is conveyed. The surface of platform 302 is sufficiently smooth for providing uninterrupted conveying of card roll 250. On the sides of conveying platform 302 two guiding rails 306 extend (further shown in FIG. 4C) to provide a guided conveying of card roll 250 along the conveying platform 302 and preventing undesired folding of roll 250, and thus, ensuring a corresponding X-Y positioning of the cards with respect to modifying member 304.

According to certain embodiments of the present invention, where modifying member 304 is dedicated to scratch cards, modifying member 304 comprises a blade of high hardness and geometrical tip shape designed to avoid excessive scratching of the cards while providing a complete scratching of the desired card areas. In some cases, the areas scratched by modifying member 304 overlap to ensure a complete scratching of the determined area.

Figure 4B:
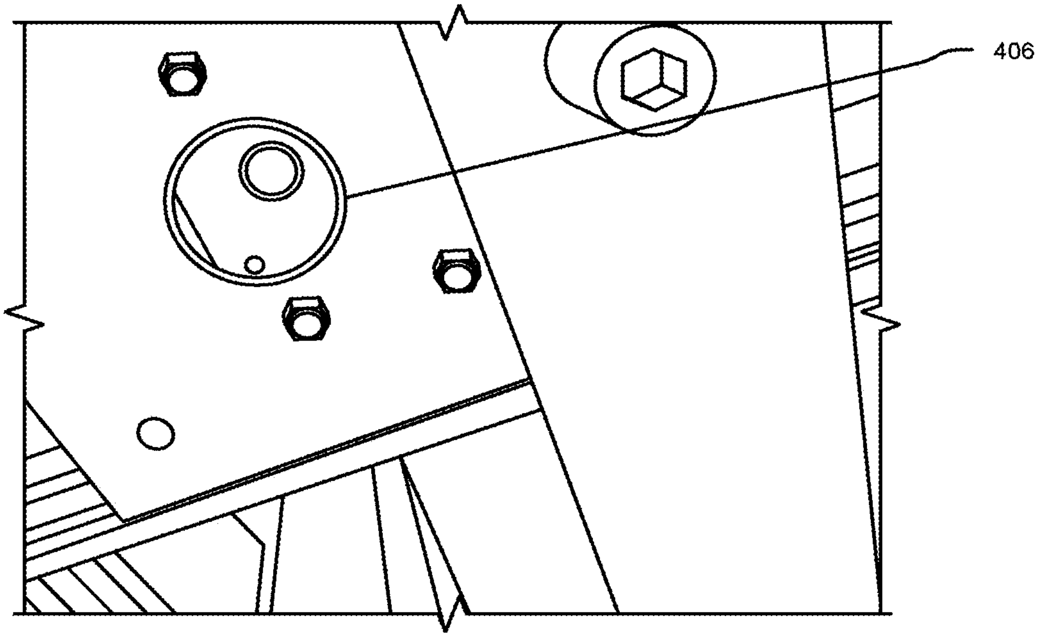
Figure 4C:
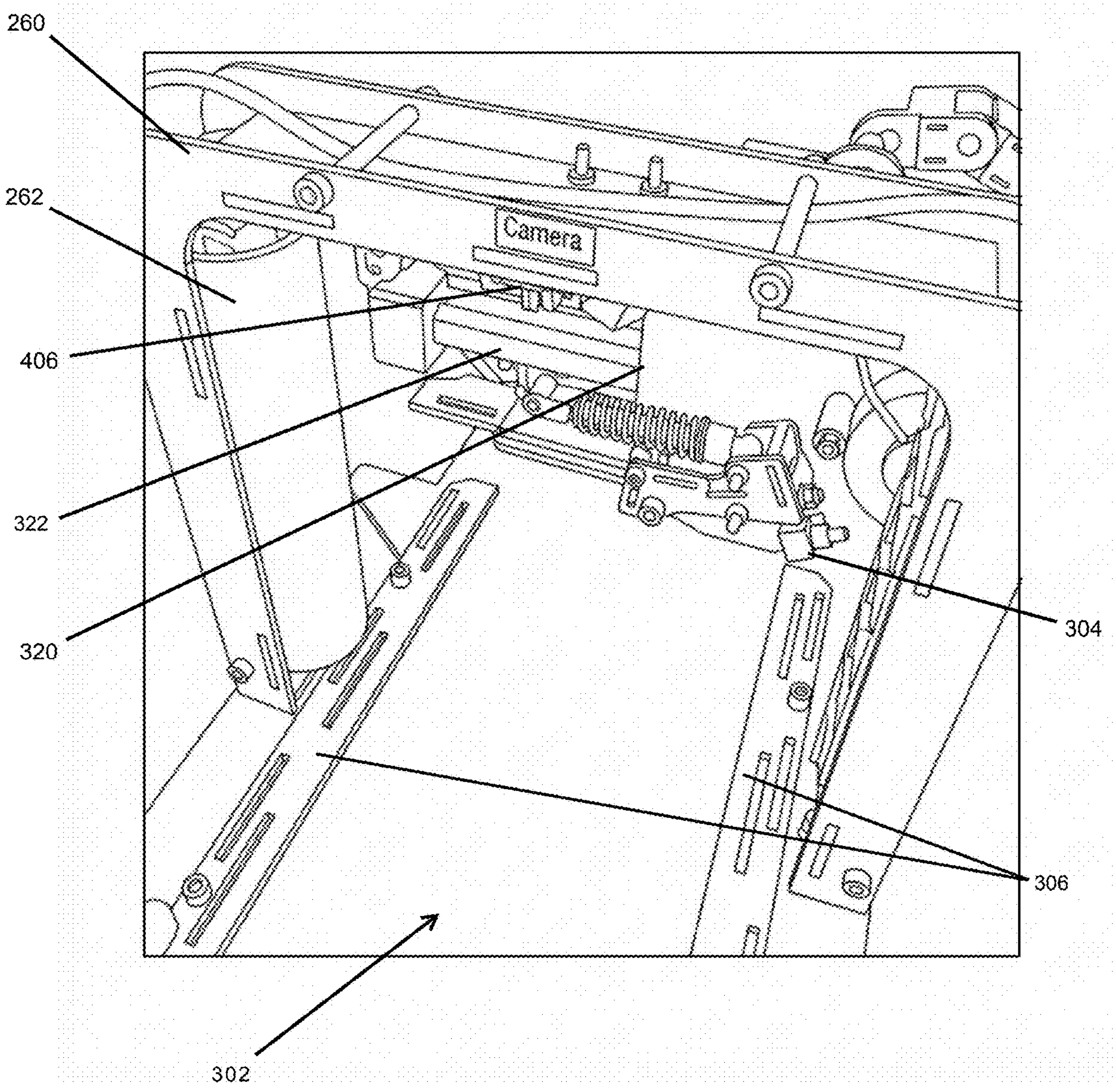
FIG. 4C is another exemplary representation of an imaging module of a computerized networked device for remote modification of physical cards, according to an embodiment of the present invention.

FIGS. 4A and 4B illustrate exemplary representations of the imaging module 400 of the present invention that forms part of the proposed networked device 100. In an exemplary aspect, the imaging module 400 can include a PCB controller and a camera 406. In an exemplary implementation, the controller can include one or more charge coupled devices (CCDs), a complimentary metal-oxide semiconductor (CMOS) (404) that can be connected to the components of the proposed networked device 100 via a cable assembly 402. In another exemplary embodiment, camera 406 of the proposed networked device 100 can be configured to capture one or more images of the physical card and transmit said images to any or a combination of the remote computing device or the central processing module (CPM). FIG. 4C is shows an exemplary configuration of imaging module 400 including bridge 260 providing a mount and determined view field for capturing images of cards conveyed underneath, and light module 262 providing soft illumination of the conveying platform surface 302. Further shown in FIG. 4C are guiding rails 306 of FIG. 3B, and carriage 320 of modifying member 304 at its rightmost X-Y position over guiding rail 322.

With respect to FIGS. 4A and 4B, card modifying terminals (see e.g., 802*i*, FIG. 8) can further include an imaging module 400 sized, adapted, and configured to capture images of the used (modified) card. The imaging module can include one or more charge coupled devices (CCDs), a complimentary metal-oxide semiconductor (CMOS) or a combination comprising one or more of the foregoing. If static images are required, the imaging module can comprise a digital frame camera, where the field of view (FOV) can be predetermined by, for example, the camera size and the distance from the card's face. The cameras used in the imaging modules of the systems, devices, method and computer programs described herein, can be digital cameras. The term "digital camera" refers in an embodiment to a digital still camera, a digital video recorder that can capture a still image of an object and the like. The digital camera can comprise an image capturing unit or module, a capture controlling module, a processing unit (which can be the same or separate from the CPM). The imaging module (see e.g., FIG. 4A, 4B), can also be configured to transmit video feed to either the display of a client terminal (see e.g., 851*j*, FIG. 8), or CPM (see e.g., FIG. 6). The video/stills can be transmitted using radio frequency, Bluetooth, ZigBee, or cellular networks. In an embodiment, the video encoding can have a format of H.264, H.265, MPEG, and the like.

Figure 5:
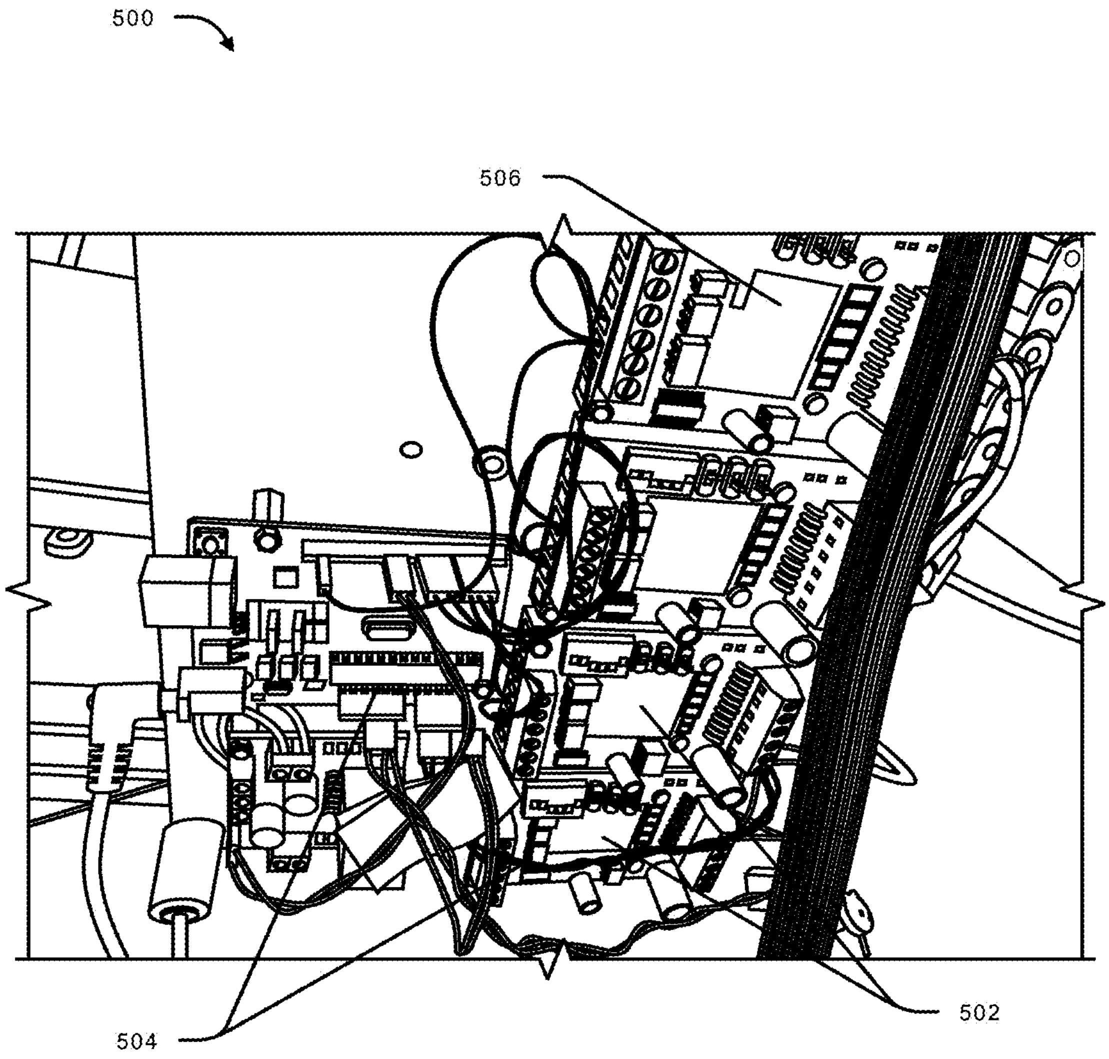
FIG. 5 illustrates an exemplary backend portion of the central processing module (CPM) of a computerized networked device for remote modification of physical cards, according to an embodiment of the present invention.

FIG. 5 illustrates an exemplary backend portion of central processing module (CPM) 600 of the proposed networked device 100 in accordance with an exemplary implementation. In an exemplary implementation, backend portion of the central processing module (CPM) 600 can include one or more driver(s) 504 and/or controller(s) 502. The proposed networked device 100 can include one or more hardware components, each of which can be operated through its respective driver 504 that can be provided by vendor of the associated hardware device and loaded as part of the operating system. Driver 504 can allow operating system and applications running on the proposed networked device 100 to communicate with the proposed networked device 100 and control its operations. The controller 502 can handle incoming and outgoing signals of the central processing module (CPM) 500. Additionally, controller(s) 502 can be responsible for transferring data between the proposed networked device 100 and the remote computing device.

In an exemplary implementation, driver(s) 504 can be configured to communicate with one or more components of the proposed networked device 100 such as PMM (300 of FIG. 3A), unmodified card holder (200 of FIG. 2A), unmodified card conveyor, the cleaning module, physically modified card holder, modified card conveyor, and imaging module (400 of FIG. 4A). Further, controller 502 can be configured to receive data from a remote computing device (e.g., by utilizing a transceiver 506), and store it temporarily in the proposed networked device 100*m* before communicating the same to the driver 504.

FIG. 6 illustrates an exemplary central processing module (CPM) 600 of the proposed networked device 100, in accordance with an exemplary implementation. In an exemplary implementation, central processing module (CPM) 600 can include a transceiver, and at least one processor. The central processing module (CPM) 600 can be configured to communicate with various components of the proposed networked device 100 such as the PMM (300 of FIG. 3A), the unmodified card holder (200 of FIG. 2A), the unmodified card conveyor, the cleaning module, the physically modified card holder, the modified card conveyor, and the imaging module (400 of FIG. 4A). Transceiver 506 (see e.g., FIG. 5) of the central processing module (CPM) 600 can be configured to communicate with a communication network, and at least one processor of the central processing module (CPM) 600 can be configured to communicate with a non-transitory storage device.

In an aspect, processor of the central processing module (CPM) 600 can be configured to receive a request for modifying at least one unmodified card 248*i* using the unmodified card conveyor 254*a*. Further, the unmodified card can be conveyed from the unmodified card holder 256*a* to the PMM 300 which physically modifies the card and. Subsequently, CPM 600 may utilize imaging module 400 to analyze the modified card 248'*i*. The analysis may be transmitted to a determined remote computer, and the modified card is delivered to the modified cards 248'*i* holder 256*b*.

According to certain embodiments of the present invention, CPM 600 may utilize common commercially available computing devices, such as a Raspberry Pi computer, to operates as the processor of the system, receive captured images from camera 406, communicate with the network, and to evaluate/analyze unmodified/modified card data. In certain exemplary configurations, commercially available controllers, e.g., one or more Arduino control modules are used as module controllers, such as for controlling the card conveyors 254*a* and 254 *b*, and electric motors (e.g., of modifying member 304). CPM 600 may be configured to communicate with these control modules for operating device 100 and for centrally collecting and/or processing the collected information. The use of commercially available computing and control components enable cost-effective production and configuration of the proposed network device 100.

In an aspect, imaging module (400 of FIGS. 4A and 4B) can be configured to transmit video feed to the CPM 600. The camera 406 of the proposed networked device 100 captures an image of the modified lottery card 248'*i* and transmits the same to the CPM 600. A processor of the CPM 600 can be configured to determine if modified lottery card 248'*i* is a winning lottery card. In case the modified lottery card 248'*i* is a winning lottery card, the card may be additionally monitored manually; otherwise, the captured image can be transmitted to originating user's access terminal.

Figure 7A:
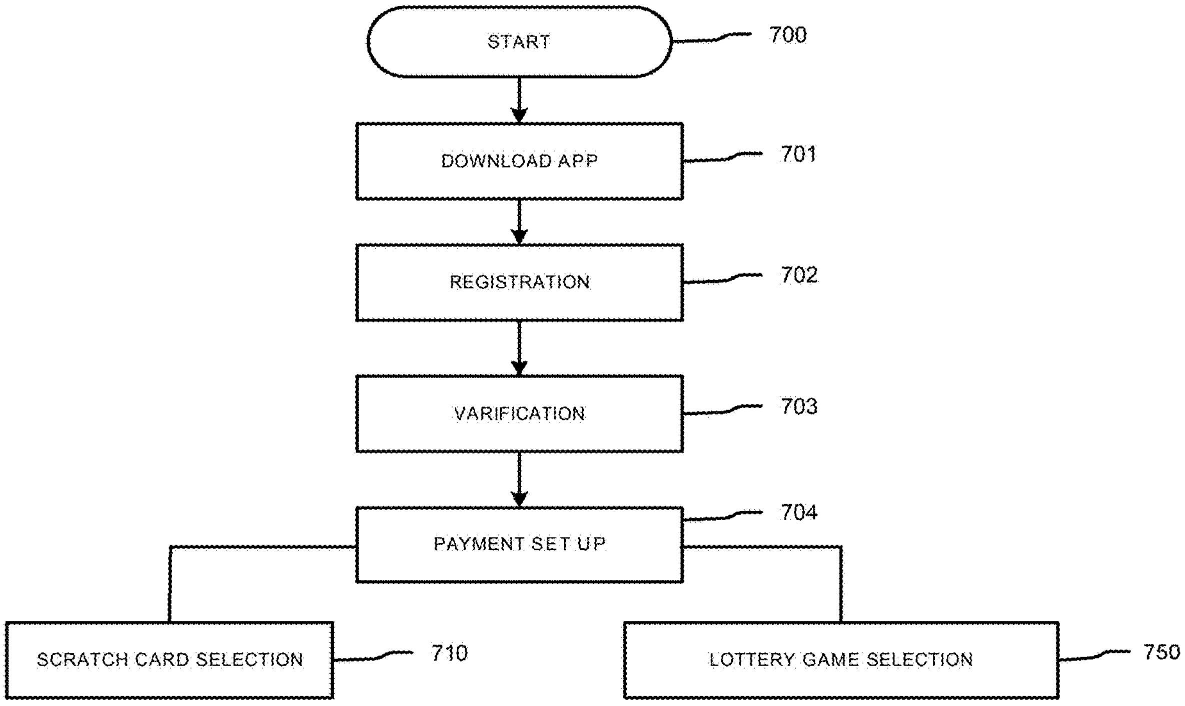
FIGS. 7A-7C illustrate exemplary flow diagrams of implementing a computerized networked system for remote modification of physical cards, according to an embodiment of the present invention.
Figure 7B:
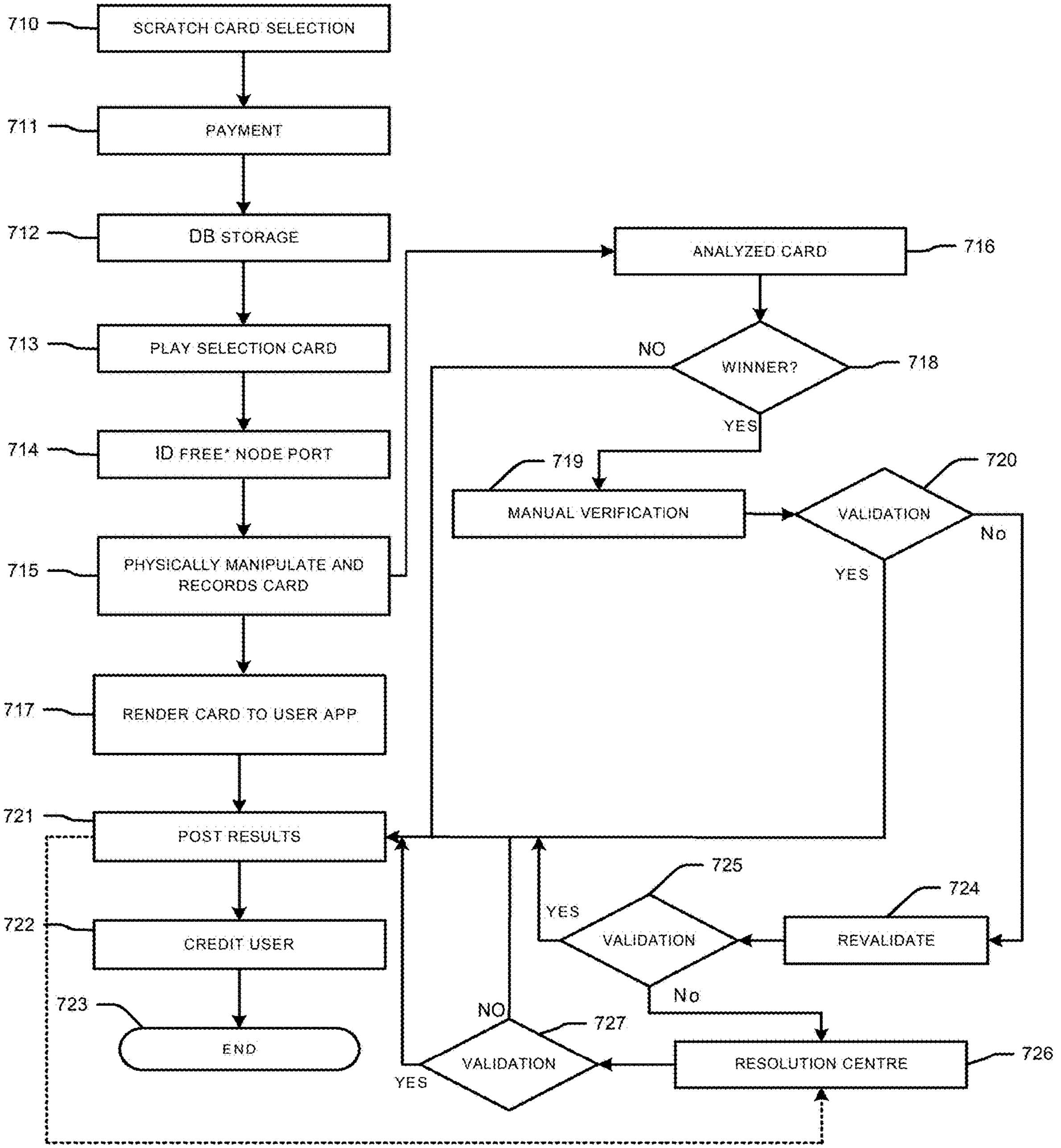
Figure 7C:
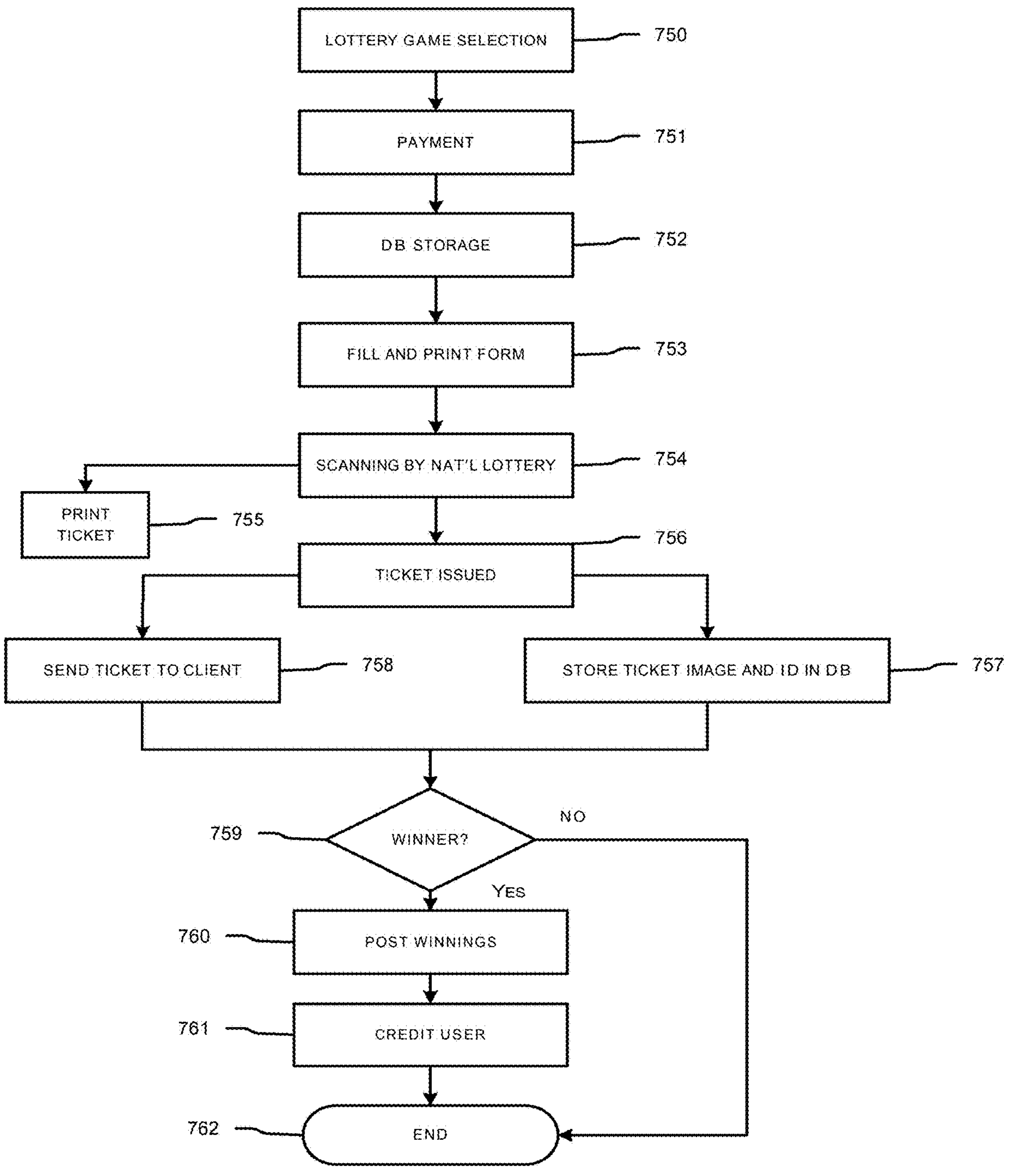

FIGS. 7A-7C illustrate exemplary flow diagrams of the proposed networked device 100 in accordance with an exemplary implementation. In an exemplary implementation, FIG. 7A illustrates an exemplary flow diagram 700 that describes detailed steps for setting up an application for remotely interacting with the proposed networked device 100. At step 701, a user (850 of FIG. 8) can download a designated application to operate on a client access terminal (851*j* of FIG. 8). The application may be configured to perform specific service by including Application Program Interface (API). At step 702, the user (850 of FIG. 8) can be directed to perform registration by including basic details such as name, date of birth (DOB), age, region, and the like. At step 703, the user (850 of FIG. 8) receives a verification link where the identity of the user (850 of FIG. 8) is verified by using various means such as OTP or fingerprint authentication and the like. At step 704, the user (850 of FIG. 8) sets up the payment method for engaging the service on the network. All the above steps 700-704 form a part of the user's authentication and authorization through the network.

In an aspect, once the user (850 of FIG. 8) is authenticated and registered, the user profile can be stored in the database on the backend management server. Now, the user (850 of FIG. 8) can choose to play the lottery by physically scratching a real scratch-lottery card (SLC) 710 or by entering a lottery drawing by purchasing a digital lottery ticket 750.

FIG. 8 illustrates an exemplary system diagram for illustrating the networked system for modifying the physical cards remotely while leaving a record of the modified card for inspection and validation in accordance with an exemplary implementation. The card modifying terminals $\mathbf{802}_i$ further comprise image printing modules 803*p*, configured when prompted, to print lottery tickets (see flow e.g., FIG. 7C). In the context of the subject disclosure, the term "printing module" refers to an image forming device(s) that uses a combination of various types of images forming systems, for example, an image forming apparatus that uses a combination of an electrophotographic system and an inkjet system. Image printing modules 803*p* may also be integrated multi-function peripherals (MFP) in which various functions such as the copy function, printer function, facsimile function, scanner function and image data saving function are integrated in one device. The system is configured to implement the functions as needed using remote commands from the backend management server BMS 801.

The MFP 803*p* in each card modifying terminal further comprises a character and image recognition functionality (OCR/OIR). In the context of the disclosure, the term "optical character recognition" encompasses both optical and digital character recognition, and the use of the term "optical character recognition" or "OCR" encompasses any mechanism for translating images of text, pictures, graphics, etc. into machine-editable text and/or a standard encoding scheme. In other words, OCR refers to the computer-based translation of an image of typewritten text into machine-editable text or a picture of characters into a standard encoding scheme. For example, the OCR engine used in the card modifying terminal(s) is operably coupled to a flatbed scanner which scans text (e.g., of the printed lottery ticket) or a picture (of the scratch-off card modified thus). The system can be further configured to place the card/ticket flush against the scanning face of the scanner, an image generated by the scanner typically exhibits even contrast and illumination, reduced skew and distortion, and high resolution. Accordingly, the OCR engine, forming a portion of the MFP module 803*p*, easily translates the text/picture in the card and/or ticket into machine-editable text or standard encoding scheme.

Furthermore, using the encoding scheme, the system can be further configured to compare the obtained image to images stored digitally in a database to make sure there are no fraud attempts in trying to cash a winning ticket twice. In one example, the database storing the digital representations of the winning tickets and/or scratch cards (obtained from the MFP module 803*p* in card modifying terminal(s) $\mathbf{802}_i$) is in communication with BMS 801.

Likewise, both the display module and the processor of the client access terminal 851*j* may further comprise a user interface module, whereby, "user interface module" broadly refers to any visual, graphical, tactile, audible, sensory, or other means of providing information to and/or receiving information from the user or other entity. For example, a set of instructions which enable presenting a graphical user interface (GUI) on display module of client access terminal $\mathbf{851}_j$ to user 850 (see e.g., FIG. 8) for displaying and changing and or inputting data associated with a request in data fields. In an embodiment, the user interface module can display any data that it reads from imaging module 400 (see e.g., FIGS. 4A and 4B), or display module of client access terminal $\mathbf{851}_j$. Accordingly and in an embodiment, client access terminal 851*j* comprises a display; a communication interface, adapted for two-way communication with the communication network; a user interface, adapted to provide the user input; and a processor, in communication with the display, the communication interface, and the user interface, the processor being in communication with a non-transitory storage device having thereon a processor-readable medium with an application program interface (API) configured, when executed, to cause the processor to: receive input from the user configured to select a card to be remotely physically manipulated; transmit the selected card to a backend management server; receive an analysis of the physical manipulation of the selected card; and render the analysis results on the display.

In an embodiment, the computerized, networked card modification devices are used as card modifying terminal(s) in the systems, method and computer programs described herein. It is noted that the system provided herein contemplates the presence of a plurality of card-modifying terminals and client access terminals, all accessing and being accessed simultaneously through the network. The term "network terminal" in the context of the card-modifying terminal(s) and client access terminal(s), refer to any device (for example, client access terminal(s) $\mathbf{851}_j$, and card modifying terminal(s) $\mathbf{802}_i$) that is accessible via an internet protocol (IP) network, such as for example, at least one of: a server, a personal computer, and laptop or notebook, linked to the IP network via a fixed or wireless link or a PDA or a smart phone linked to the IP network via a wireless link, and the term "Network Access Terminal" refers to any device, such as for example a mobile phone, able to be connected to a Mobile Communication Network. The term "terminal" may further include some or all the functionality of, a user equipment (UE), a wireless or wired communication device, a network device, a personal communication device, mobile device, and/or a mobile station. In an embodiment, the network access terminal can be a hotspot, referring to a public access venue, location and/or geographical area in which a wireless access point (WAP) provides wireless network services (e.g. 802.11a/b/g/n based or supported services, WiMax based or supported services, cellular network based or supported services such as via CDMA, HSDPA, GPRS, etc., and other such services) to mobile users through a wireless local area network (WLAN), metropolitan area network (MAN), wide area network (WAN), or the like, using, for example but not limited to, Wi-Fi technology or the like.

As indicated in FIG. 8, the systems disclosed further comprises a network node of a card issuing entity 810 (see e.g., 810 FIG. 8). The card issuing entity 810 can be, for example, a lottery administrating agency, an election administering agency, their combination, and the like. The card-issuing entity can be any third party that issues a card or, for that matter, services any function of the card or is otherwise assigned to intervene in the functionality of the unmodified or modified card. These may be, for example, at least one of: government agencies, regulatory agencies, banks, credit unions, private entities, and their combination.

Also included in the system implementing the methods provided herein is a backend management server (BMS) 801 comprising: a management communication interface, adapted for two-way communication with the communication network; a first non-transitory storage device; and a backend processing module (BPM) in communication with each card modifying terminal 802*i*, the client terminal 851*j*, and the card-issuing entity 810, the BPM further comprising at least one backend processor in communication with a non-transitory storage device having thereon a processor-readable medium with a set of executable instructions configured, when executed, to cause the at least one processor to: receive the unmodified card selection from the client access terminal 851*j*; locate a predetermined card modifying terminal 802*i*; transmit the selection to the predetermined card modifying terminal 802*i*; receive the analysis transmittal from the predetermined card modifying terminal 802*i*; and based on the analysis, inform the card issuing entity 810. In the context of the systems disclosed, the term "backend management server" is intended to refer broadly to a computing device that includes at least some degree of network management capability over devices and assets on the communication network. For example, backend management server 801 may deploy a management server to configure, manage, and monitor a portion of the communication network, such as, for example, to run an allocation algorithms that determines the card modifying terminal 802*i* where the queue (assuming multiple requests/terminal) for the physical modification of the selected card is the shortest, meaning execution of the request will return results the fastest; and transmit the request to that terminal. Accordingly, the set of executable instructions of the BPM is further configured, when executed, to cause the at least one processor to: determine the card game selected by the user; allocate the game to the card modifying terminal where the queue for the physical modification of the selected unmodified card is the shortest; and transmit the selected card request to that terminal. An example for such an allocation algorithm is set forth in the Computer Program Listing Appendix in .txt format.

Moreover, the systems provided herein can be configured to use internal database(s), for example, the first non-transitory storage device in communication with the BCM (micro-SQL), to store and/or authenticate users, modified card (and/or winning lottery tickets) images, payments and the like. This Database should be easily synched with main Networking Authentication databases/servers. This feature will allow to provide local Authentication and even Authorization in order to provide advanced level of security and increase the level of reliable secured access to the network. Supported authentication sources for the user can be, for example: lightweight directory access protocol (LDAP), Microsoft Active Directory, Novell eDirectory, OpenLADP or any LDAP compliant server, Cisco ACS, RADIUS (FreeRADIUS, Radiator, etc.), Microsoft NPS, or any RADIUS-compliant server, Local user file (Apache htpasswd format), OAuth2, Facebook, Google, GitHub, LinkedIn, Microsoft Live, Twitter, security assertion markup language (SAML), or a combination comprising the foregoing authentication measures.

In an embodiment, the devices and systems disclosed are used to implement the methods disclosed herein. Accordingly, provided herein is a method of remotely physically scratching a scratch-lottery card (SLC) by a user, implementable in a computerized networked system comprising: a plurality of computerized SLC modifying terminals, each terminal comprising: a physical modification module (PMM) 300; an unmodified SLC holder 256*a*; an unmodified SLC conveyor 254*a*; a modified SLC holder 256*b*; a modified SLC conveyor 254*b*; an imaging module; a cleaning module such as a blower 258 configured to remove physical modification residues from the modified cards; and a central processing module (CPM) in communication with the PMM 300, the unmodified SLC holder 256*a*, the unmodified SLC conveyor 254*a*, potentially the cleaning module such as a blower 258, the modified SLC holder 256*b* the modified SLC conveyor 254*b*, and the imaging module, the CPM further comprising: a transceiver 506 in communication with a communication network; and at least one processor in communication with a non-transitory storage device having thereon a processor-readable medium with a set of executable instructions configured, when executed, to cause the at least one processor to: receive a request for remotely scratching at least one unmodified SLC 248*i*; using the unmodified SLC conveyor 254*a*, convey the unmodified SLC 248*i* from the unmodified SLC holder 256*a* to the PMM 300; scratching the SLC; analyze the scratched SLC by utilizing imaging module 400; transmit the analysis; and provide the analysis to the a client terminal 851*j* comprising: a display; a communication interface, adapted for two-way communication with the communication network; a user interface, adapted to provide the user's input; and a processor, in communication with the display, the communication interface, and the user interface, the processor being in communication with a non-transitory storage device having thereon a processor-readable medium with an application program interface (API) configured, when executed, to cause the processor to: receive input from the user configured to select the SLC to be remotely scratched; transmit the selected SLC to a backend management server 801; receive an analysis of the selected, remotely scratched SLC; and render the analysis results on the display and to the unmodified SLC issuing entity 810; and a backend management server (BMS) 801 comprising: a management communication interface, adapted for two-way communication with the communication network; a first non-transitory storage device; and a backend processing module (BPM) in communication with each SLC modifying terminal 802*i*, the client terminal 851*j*, and the unmodified SLC-issuing entity 810, the BPM further comprising at least one backend processor in communication with a second non-transitory storage device having thereon a processor-readable medium with a set of executable instructions configured, when executed, to cause the at least one processor to: receive the unmodified SLC selection from the client terminal 851*j*; locate a predetermined SLC modifying terminal 802*i*; transmit the selection to the predetermined SLC modifying terminal 802*i*; receive the analysis transmittal from the predetermined SLC modifying terminal PMM 300; and based on the analysis, optionally inform the SLC issuing entity 810, the method comprising: selecting at least one SLC 248*i* by the user through the client access terminal 851*j*; transmitting a request to the backend management server 801 by the user access terminal to scratch the selected SLC; the backend management server 801, allocating a predetermined SLC modifying terminal 802*i*; transmitting the request to the predetermined SLC modifying terminal 802*i*; and remotely scratching the SLC by the predetermined SLC modifying terminal 802*i*.

In another embodiment, the method further comprises using the imaging module 400, analyzing the remotely scratched SLC 248'*i*; based on communication received from the SLC issuing entity 810, determining if the remotely scratched SLC 248'*i* is a winning SLC; if the SLC is a winning SLC, providing the scratched SLC to a manual monitor; if the manual monitor validates the SLC as a winning SLC, informing at least one of the backend management server 801, the user terminal 851*j*, and the SLC-issuing entity 810; otherwise reexamining the SLC using a second monitor. It is noted, that in certain jurisdictions it is prohibited to pre-scratch the SLC and upon selection by the user on the client access terminal 851*j*, merely delivering the user the results of the pre-scratched SLC 248*i*. Rather, the sequence of steps must be time-stamped in such a way that the request must precede physical scratching of the SLC.

Additionally, the method further comprises determining if the SLC 248'*i* is a winning SLC, the backend management server 801, receiving a financial instrument corresponding to the enumerated winning of the SLC from the SLC-issuing entity 810: and crediting the user with the winnings. The financial instrument can be a check, a bank note, a wire transfer, or any method affecting payment to the user. Moreover, each SLC scratching terminal 802*i*, is configured to store the scratched SLC in the scratched SLC holder 256*b*, while the backend management server 801 stores a captured image of the scratched SLC 248'*i* (or, if a winner, the financial instrument crediting the user with the winnings) on the first non-transitory storage device (e.g., the database).

In an embodiment, the PMM 300 is configured to remove ink from the SLC 248*i* in at least one predetermined location on the unmodified SLC 248*i* and the set of executable instructions of the card modifying terminal 802*i* is further configured, when executed, to cause the at least one processor to: capture an image of the analyzed modified lottery card 248'*i*; determine if the modified lottery card 248'*i* is a winning lottery card; if the modified lottery card 248;*i* is the winning lottery card, provide the card for manual monitoring; otherwise transmit the captured image to the originating client access terminal 851*j*. Manual monitoring can be used to independently validate and inspect the card, thus providing an added layer of security to the physical record of the process. In the context of the disclosure, the term "manual monitoring" and its derivative, refers to the inspection and validation of the modified card 248'*i* by a third party. The third-party monitoring can be either automatic (no human involvement, e.g., through computerized image analysis) or using a representative of any group in the network, for example, at least one of a representative of: the user, the network manager, and the card-issuing entity.

An example of the methods described herein, utilizing the devices, systems and programs disclosed, is illustrated in FIGS. 7A-7C and 8. Turning to FIG. 7A, where user 850 downloads 701 the APP containing the API for executing the client portion of the methods disclosed, after which the user registers 702, with the service, verify their identity 703, and sets up the payment method 704 for engaging the service on the network. All three steps form a part of the users' authentication and authorization by the network.

In the context of this disclosure, authorization, refers to the process of defining the action(s)/network(s)/service(s) that authenticated users and/or remote devices are entitled to, based on user, device, temporospatial location data, and access profiles. In cases of remote access attempts by the user, access profiling can also depend on access provider, temporospatial location, or their combination. It will be appreciated that different combinations of the above processes may be implemented by a common processing module and/or different intercommunicating modules, using different numbers of steps, or iterations, and having different levels of redundancy and/or parallel processing to provide a selected level of efficiency and/or accuracy.

Once authenticated and registered by the system, and the user profile stored in the first database on the backend management server 801, the user can choose to play the lottery by using a scratch lottery card (SLC) 710 or entering a lottery drawing by purchasing a lottery ticket 750.

Turning now to FIG. 7B, illustrating a flow chart describing an example of the steps implemented by the system for remotely, physically modifying a card while leaving a record of the modified card for inspection and validation and delivering the manipulation results to a user, and/or other third parties. As illustrated, user 850, using client access terminal 851*j* selects the scratch card they wish to play. It is noted the client access terminal (CAT) 851*j*, containing display module can be configured to present a number of SLCs, each stored as unmodified SLC on one or more SLC-modifying terminal 802*i* in communication with the network. Following selection 710, the user, whose profile is stored by the backend management server (BMS) 801, pays 711 for the service and the payment record is stored 712 on the first database of the BMS 801. The selected card is then played 713 by identifying 714 user 850 and scratching 715 the SLC by the SLC-modifying terminal 802*i*. The card is then inspected and analyzed 716, for example using the imaging/MFP module 803*p* in the modifying terminal 802*i* and the scratched SLC is rendered 717 to the display module of CAT 851*j*. If the SLC is determined 718 to be a winning card (e.g., by employing image recognition mechanism that compares the numbers revealed on the card face against data provided by the SLC-issuing authority 810), the card is removed for additional inspection and validation 719, where if winning validation 720 is confirmed and the SLC is indeed a winning card, the result is posted 721, and the user account provided initially (see e.g., 701-703, FIG. 7A) is credited 722. If, however, the manual inspection 719 determines a discrepancy in the original determination 718, the physical card is removed for revalidation 724 by a third party (in other words, not the SMT or the user) where additional validation 725 takes place. If the card is determined in the revalidation to be a winning card, the results will be posted 721 to the user's CAT 851*j*. If, however, a determination is inconclusive, or the card is determined NOT to be a winning card, the physical card will be sent to resolution center for additional inspection 726, and a final validation query 727 will take place, and the results will post 721 to the user. In addition, once results are posted 721 by the system to the user's device, the user can apply for arbitration to resolution center 726 for final arbitration. It is noted that the resolution center is preferably the administrator of the system, but not necessarily where the BMS 801 is physically located.

Turning now to FIG. 7C, illustrating a flow chart describing an example of the steps implemented by the system for playing the lottery by selecting a lottery ticket for a drawing while simultaneously maintaining a physical record of the selected ticket for independent inspection and validation; followed by delivering the drawing results to a user, and/or other third parties. As illustrated, user 850, using CAT 851*j*, select the lottery ticket desired 750. It is noted, that similarly to the SLCs, here too, there may be many different drawings offered at any given time and user 850 can get a rendering on the display module of the CAT of these (lottery) tickets and choose at least one of these tickets, while the BMS 801 will have the data to direct the selection to the proper terminal for execution. In the context of the disclosure, "lottery ticket" or "ticket" and their derivative(s) shall refer to any type of ticket, including an electronic representation of a ticket, used in any type of lottery game offered by a lottery game provider. It is noted that, there are two basic types of lottery games that are popular-drawing-type lottery games and instant-type lottery games. These lottery games include any number of variations and combinations. The present systems, methods and programs can be applied to these and other types of lottery games.

Accordingly, following payment 751 by the user, the operation is stored 752 on the BMS 801 database, the necessary forms are filled 753, either automatically by scanning terminal (e.g., SMT) 801*i*, or by the associated MFP module 803*p*, and delivered to scanning terminal 754, after which, the physical lottery ticket is printed 755 (locally) and issued 756 to the user (rendered on the user CAT 851*j* 758, while simultaneously, an image of the issued lottery ticket is scanned and stored 757 by MFP module 803*p* to the database. A winning query 759 is done by, for example, comparing the image of the stored ticket data obtained in 757 against an image or code scheme obtained from the national lottery provider. If the ticket is determined to be a winner, results are posted 760 to the user's CAT 851*j* and the user account is credited 761. An example of such a game administration algorithm is provided in the Computer Program Listing Appendix attached in a .txt format.

Also, using the systems, methods and computer-readable medium provided herein, it may be possible to support integration with online billing/payment solution(s) such as Authorize.net, PayPal, Stripe and more. Using this integration, user/client can handle online payments, required, for example, to get proper network access, pay for SLC and collect winnings.

It is therefore possible to implement a profile, which defines the registration workflow that will be used, for example, whether the user is a subscriber or not, whether the numbers played are used consistently or chosen every access, etc. In other words, the user/client can define different portal profiles-based attribute stored on the BMS 801.

In the context of the disclosure, the term "node" refers to a gateway device, a network switch, a network functions virtualization ("NFV") entity, a software defined network ("SDN") controller or a combination thereof.

As used herein, the term "processor" is defined as including, but not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof. In addition, the computer program (software and/or firmware), can comprise program code means for carrying out the steps of the methods described herein, as well as a computer program product comprising program code means stored on a medium that can be read by a computer, such as a hard disk, SATA CD-ROM, DVD, USB memory stick, or a storage medium that can be accessed via a data network, such as the Internet or Intranet, when the computer program product is loaded in the main memory of a computer and is carried out by the computer. Thus, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media.

More specific examples of suitable non-transitory storage medium and non-transitory computer-readable storage medium include, but are not limited to, a magnetic computer diskette such as floppy diskettes or hard drives, magnetic tape, a random-access memory (RAM), a read-only memory (ROM), an erasable programmable read-only memory (EPROM), a flash drive, a compact disc (CD), or a digital video disk (DVD).

Non-transitory storage (Memory) device(s) as used in the methods described herein can be any of various types of non-transient memory devices or storage devices (in other words, memory devices that do not lose the information thereon in the absence of power). The term "memory device" is intended to encompass an installation medium, e.g., a CD-ROM, floppy disks, or tape device or a non-transient memory such as a magnetic media, e.g., a hard drive, optical storage, or ROM, EPROM, FLASH, etc. The memory device may comprise other types of memory as well, or combinations thereof. In addition, the memory medium may be located on a first computer in which the programs are executed, and/or may be located on a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Further, the processor may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The term "module" is used herein to refer to software computer program code and/or any hardware or circuitry utilized to provide the functionality attributed to the module. Further, the term "module" or "component" can also refer to software objects or routines that are executed on the computing system. The different components, modules, engines, and services described herein may be implemented as objects or processes that execute on the computing system (e.g., as separate threads). Likewise, "BMS" (see e.g., FIG. 8, 801), refers to a network device which receives data at multiple input ports and provides that data to an output port (e.g., capable of returning a value in an ARP table), for transmission over a communication link, and may also include computer networking devices such as a hub, router, bridge, gateway, multilayer switch and the like. In an embodiment, BMS 801 comprises a network switch configured to support layer 3 switching/Routing.

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "central processing module" (CPM), "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information.

Note that if the processor, module, servers, network switches etc., processing circuit, and/or processing unit includes more than one processing device, the processing devices may be centrally located or may be distributed (e.g., cloud computing via indirect coupling via a local area network and/or a wide area network). Still further it is noted that, the memory element may store, and processor, module, processing circuit, and/or processing unit executes, hard coded and/or operational instructions corresponding to at least some of the steps and/or functions illustrated in one or more of FIG. 8 elements. Such a memory device or memory element can be and is included in an example as an article of manufacture.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the location (s) includes one or more location). Reference throughout the specification to "one embodiment", "another embodiment", "an embodiment", and so forth, when present, means that a particular element (e.g., step, feature, structure, and/or characteristic) described in connection with the embodiment is included in at least one embodiment described herein, and may or may not be present in other embodiments. In addition, it is to be understood that the described elements may be combined in any suitable manner in the various embodiments.

Accordingly, in an exemplary implementation, provided herein is a networked device for physically modifying a plurality paper cards, comprising: a physical modification module (PMM); an unmodified card holder; an unmodified card conveyor a physically modified card holder; a modified card conveyor; an imaging module; optionally a cleaning module; and a central processing module (CPM) in communication with the PMM, the unmodified card holder, the unmodified card conveyor, potentially the cleaning module, the physically modified card holder the modified card conveyor, and the imaging module, the CPM further comprising: a transceiver in communication with a communication network; and at least one processor in communication with a non-transitory storage device having thereon a processor-readable medium with a set of executable instructions configured, when executed, to cause the at least one processor to: receive a request for modifying at least one unmodified card; using the unmodified card conveyor, convey the unmodified card from the unmodified card holder to the PMM; physically modify the card; analyze the modified card; transmit the analysis; and deliver the modified card to the modified cards holder, wherein (i) the set of executable instructions are further configured, when executed, to cause the at least one processor to: prior to analyzing the modified card, using the modified cards conveyor, conveying the modified card to the cleaning module; and cleaning the modified card, (ii) the unmodified card is at least one of: a lottery scratch card, and a ballot card, wherein (iii) the PMM comprises: a conveying platform a modifying member having a distal end sized and configured to remove a portion of the unmodified card, coupled to the conveying platform, and wherein the conveying platform is configured to move at least one of the modifying member, the distal end of the modifying member, and the unmodified card in an X-Y direction, wherein (iv) the imaging module comprises a charge coupled devices (CCDs), a complimentary metal-oxide semiconductor (CMOS), or a combination comprising one or more of the foregoing, (v) the PMM is configured to remove ink in at least one predetermined location on the card, (vi) the PMM is configured to form an opening in the card at a predetermined location, wherein (vii) the plurality of unmodified cards form a single roll wherein each card is separated from an adjacent card by at least one of: scoring perforation, machine-readable marker, and a blank gap, and wherein (viii) the single roll is adapted to form a Z-fold section.

In another exemplary implementation, provided herein is a networked computerized card-modifying system, comprising: a plurality of computerized card modifying terminals, each terminal comprising: a physical modification module (PMM); an unmodified card holder; an unmodified card conveyor; a physically modified card holder; a modified card conveyor; an imaging module; optionally a cleaning module; and a central processing module (CPM) in communication with the PMM, the unmodified card holder, the unmodified card conveyor, potentially the cleaning module, the physically modified card holder the modified card conveyor, and the imaging module, the CPM further comprising: a transceiver in communication with a communication network; and at least one processor in communication with a non-transitory storage device having thereon a processor-readable medium with a set of executable instructions configured, when executed, to cause the at least one processor to: receive a request for modifying at least one unmodified card; using the unmodified card conveyor, convey the unmodified card from the unmodified card holder to the PMM; physically modify the card; analyze the modified card; transmit the analysis; and convey the modified card to the modified cards holder a client terminal comprising: a display; a communication interface, adapted for two-way communication with the communication network; a user interface, adapted to provide the user input; and a processor, in communication with the display, the communication interface, and the user interface, the processor being in communication with a non-transitory storage device having thereon a processor-readable medium with an application program interface configured, when executed, to cause the processor to: receive input from the user configured to select a card to be remotely physically modified; transmit the selected card to a backend management server; receive an analysis of the physical modification of the selected card; and render the analysis results on the display; the unmodified card issuing entity; and a backend management server comprising: a management communication interface, adapted for two-way communication with the communication network; a first non-transitory storage device; and a backend processing module (BPM) in communication with each card modifying terminal, the client terminal, and the unmodified card-issuing entity, the BPM further comprising at least one backend processor in communication with a non-transitory storage device having thereon a processor-readable medium with a set of executable instructions configured, when executed, to cause the at least one processor to: receive the unmodified card selection from the user terminal; locate a predetermined card modifying terminal; transmit the selection to the predetermined card modifying terminal; receive the analysis transmittal from the predetermined card modifying terminal; and based on the analysis, inform the card issuing entity, wherein (ix) each card modifying terminal is further configured to provide the analyzed modified card to a manual monitor, (x) the unmodified card is at least one of: a lottery scratch card, and a ballot card, (xi) the unmodified card-issuing entity is at least one of: a lottery administrating agency, and an election administering agency, the system further comprising (xii) a plurality of user terminals, wherein (xiii) the set of executable instructions of the BPM is further configured, when executed, to cause the at least one processor to: determine the card modifying terminal where the queue for the physical modification of the selected unmodified card is the shortest; and transmit the selected card request to that terminal, wherein (xiv) the unmodified card is the scratch lottery card, the PMM is configured to remove ink in at least one predetermined location on the unmodified lottery card and the set of executable instructions of the card modifying terminal is further configured, when executed, to cause the at least one processor to: capture an image of the analyzed modified lottery card; determine if the modified lottery card is a winning lottery card; if the modified lottery card is the winning lottery card, provide the card for manual monitoring; otherwise transmit the captured image to the originating user access terminal, wherein (xv) wherein the plurality of unmodified cards form a single roll wherein each card is separated from an adjacent card by at least one of: scoring perforation, machine-readable marker, and a blank gap, and wherein (xvi) the single roll is adapted to form a Z-fold section.

In yet another exemplary implementation, provided herein is a method of remotely physically scratching a scratch-lottery card (SLC) by a user, implementable in a computerized networked system comprising: a plurality of computerized SLC modifying terminals, each terminal comprising: a physical modification module (PMM); an unmodified SLC holder; an unmodified SLC conveyor; a modified SLC holder; a modified SLC conveyor; an imaging module; a cleaning module; and a central processing module (CPM) in communication with the PMM, the unmodified SLC holder, the unmodified SLC conveyor, potentially the cleaning module, the modified SLC holder the modified SLC conveyor, and the imaging module, the CPM further comprising: a transceiver in communication with a communication network; and at least one processor in communication with a non-transitory storage device having thereon a processor-readable medium with a set of executable instructions configured, when executed, to cause the at least one processor to: receive a request for remotely scratching at least one unmodified SLC; using the unmodified SLC conveyor, convey the unmodified SLC from the unmodified SLC holder to the PMM; scratching the SLC; analyze the scratched SLC; transmit the analysis; and provide the analysis to the user a client terminal comprising: a display; a communication interface, adapted for two-way communication with the communication network; a user interface, adapted to provide the user's input; and a processor, in communication with the display, the communication interface, and the user interface, the processor being in communication with a non-transitory storage device having thereon a processor-readable medium with an application program interface (API) configured, when executed, to cause the processor to: receive input from the user configured to select the SLC to be remotely scratched; transmit the selected SLC to a backend management server; receive an analysis of the selected, remotely scratched SLC; and render the analysis results on the display; the unmodified SLC issuing entity; and a backend management server comprising: a management communication interface, adapted for two-way communication with the communication network; a first non-transitory storage device; and a backend processing module (BPM) in communication with each SLC modifying terminal, the client terminal, and the unmodified SLC-issuing entity, the BPM further comprising at least one backend processor in communication with a second non-transitory storage device having thereon a processor-readable medium with a set of executable instructions configured, when executed, to cause the at least one processor to: receive the unmodified SLC selection from the user terminal; locate a predetermined SLC modifying terminal; transmit the selection to the predetermined SLC modifying terminal; receive the analysis transmittal from the predetermined SLC modifying terminal; and based on the analysis, optionally inform the SLC issuing entity, the method comprising: selecting at least one SLC by the user; transmitting a request to the backend management server by the user access terminal to scratch the selected SLC; the backend management server, allocating a predetermined SLC modifying terminal; transmitting the request to the predetermined SLC modifying terminal; and remotely scratching the SLC by the predetermined SLC modifying terminal, wherein the method further comprises (xvii) using the imaging module, analyzing the remotely scratched SLC; determining if the remotely scratched SLC is a winning SLC; if the SLC is a winning SLC, providing the scratched SLC to a manual monitor; if the manual monitor validates the SLC as a winning SLC, informing at least one of the backend management server, the user terminal, and the SLC-issuing entity; otherwise reexamining the SLC using a second monitor, wherein the system further comprises (xvii) a plurality of additional users, each user having an additional user terminal, each comprising: a display; a communication interface, adapted for two-way communication with the communication network; a user interface, adapted to provide the user's input; and a processor, in communication with the display, the communication interface, and the user interface, the processor being in communication with a non-transitory storage device having thereon a processor-readable medium with the application program interface (API), wherein (xviii) the step of allocating the predetermined SLC modifying terminal to each user access terminal comprises: determining where the queue for the scratching of the selected unmodified SLC is the shortest; and transmitting the selected request to that terminal, the method further comprising (xix) if the SLC is a winning SLC, the backend management server, receiving a financial instrument corresponding to the enumerated winning of the SLC from the SLC-issuing entity: and crediting the user with the winnings, (xx) each SLC scratching terminal, further storing the scratched SLC in the scratched SLC holder; the backend management server, storing a captured image of the scratched SLC on the first non-transitory storage device; and if the SLC is a winning SLC, the backend management server storing an image of the financial instrument on the first non-transitory storage device, wherein (xxi) the plurality of unmodified paper cards in the networked system, form a single roll wherein each card is separated from an adjacent card by at least one of:

scoring perforation, machine-readable marker, and a blank gap, wherein (xxii) the step of remotely scratching the SLC by the predetermined SLC modifying terminal, is preceded by a step of: using a rotatable transfer drum included in the system, pulling the single roll to a corresponding location in the PMM; using the rotatable transfer drum, pulling the single roll to a corresponding location in at least one of: an imaging module, and a scanning module; and capturing an image of the scanned card, and wherein the method further comprises (xxiii) using the rotatable transfer drum pulling the single cards' role to the modified card holder, forming a Z-folded stack of modified cards.

Although the foregoing disclosure has been described in terms of some embodiments, other embodiments will be apparent to those of ordinary skill in the art from the disclosure herein. Moreover, the described embodiments have been presented by way of example only and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

The invention claimed is:

1. A networked device for remotely modifying physical cards, comprising:

a. a first card holder and a second card holder, the first card holder is configured to store a plurality of unmodified cards, and the second card holder is configured to receive and store physically modified cards;

b. a first card conveyor and a second card conveyor, configured to convey cards over a conveying platform, between said first card holder and said second card holder;

c. a physical modification module (PMM), which is configured to displace a modifying member, for physically modifying an unmodified card conveyed therethrough over said conveying platform, by removing at least one portion of the card;

d. an imaging module comprising one or more light modules and a camera configured to capture images of the cards conveyed on said conveying platform;

e. a cleaning module, configured to remove physical modification residues from the cards during and following their physical modification; and f. a central processing module (CPM) configured to be in communication with one or more controllers of said first and second card holders, said first and second card conveyors, said PMM, said imaging module, said cleaning module, and with a communication network, wherein said CPM is configured to receive remote requests for modifying one or more selected unmodified cards, to operate said first and second card conveyors, said PMM, said imaging module, and said cleaning module, for physically modifying the one or more selected unmodified cards, and to capture one or more images of said selected unmodified cards and of modified cards.

2. The networked device of claim 1, wherein the CPM is further configured to analyze the one or more captured images and to submit the analysis to a remote computing device.

3. The networked device of claim 1, wherein the PMM comprises adjustment means facilitating its adjustment to different pressure levels applied on a modified card.

4. The networked device of claim 3, wherein the adjustable pressure levels enable the PMM to remove ink from the physical card.

5. The networked device of claim 3, wherein the adjustable pressure levels enable the PMM to remove a scratchable layer from the physical card.

6. The networked device of claim 1, wherein the modifying member displacement is perpendicular to the conveying direction of the cards conveyed therethrough.

7. The networked device of claim 1, wherein the cleaning module comprises one or more cleaning means selected from the group consisting of: a blower, a brush, a suction device, and any combination thereof.

8. The networked device of claim 7, wherein at least one of the one or more cleaning means is installed next to the modifying member.

9. The networked device of claim 7, wherein at least one of the one or more cleaning means is directed to the conveying platform.

10. The networked device of claim 1, wherein the PMM is configured to form an opening in at least one unmodified card at a predetermined location.

11. The networked device of claim 1, wherein the imaging module comprises one or more charge-coupled devices (CCDs), a complimentary metal-oxide semiconductor (CMOS), or a combination thereof.

12. The networked device of claim 1, wherein the one or more light modules are configured to irradiate soft light.

13. The networked device of claim 1, wherein the one or more light modules of the imaging module are positioned in an angle to prevent reflections from illuminated cards.

14. The networked device of claim 1, wherein the plurality of unmodified cards is chained to form a single roll, wherein each card is separated from an adjacent unmodified card by at least one of: a scoring perforation, a machine-readable marker, and a blank gap.

15. The networked device of claim 14, wherein the single roll forms a Z-fold section.

16. A networked computerized card-modifying system, comprising:

a. a plurality of networked card modifying terminals, each of which is a networked device according to claim 1;

b. one or more networked client access terminals comprising: a display; a communication interface adapted for two-way communication with the communication network; a user interface adapted to provide user input; and a processor in communication with the display, configured to receive a user's request to physically modify one or more unmodified cards selected by the user, transmit said user's request to a backend management server, receive modified card analysis of said one or more cards selected by the user from said backend management server, and render the analysis results on the display;

c. a card issuing entity; and d. a Backend Management Server (BMS) comprising: a management communication interface, adapted for two-way communication with the communication network; a first non-transitory storage device; and a backend processing module (BPM) in communication with each of said plurality of networked card modifying terminals, said one or more networked client access terminals, and said card issuing entity, whereby said BMS is configured to:

i. receive said one or more users' requests to physically modify one or more selected unmodified cards, from one or more of said one or more networked client access terminals;

ii. locate a predetermined networked card modifying terminal of said plurality of networked card modifying terminals for each request;

iii. transmit each of said users' requests, to physically modify one or more selected unmodified cards, to its predetermined networked card modifying terminal;

iv. receive unmodified card information and modified card analysis from each predetermined networked card modifying terminal associated to each request; and v. based on the analysis, inform the card issuing entity and the corresponding networked client access terminals.

17. The system of claim 16, wherein each networked card modifying terminal is further configured to provide an analyzed modified card to a manual monitor.

18. The system of claim 16, wherein the BMS is configured to locate a predetermined networked card modifying terminal with the shortest queue for each physical card modification of the unmodified card request and transmit physical card modification instructions to the located predetermined networked card modifying terminal.

19. The system of claim 16, wherein the predetermined networked card modifying terminal is further configured to:

a. capture an image of the analyzed physically modified card;

b. determine if said analyzed physically modified card is a winning card;

c. if said analyzed card is the winning card, provide the card for manual monitoring; and d. transmit the captured image to the originating networked client access terminal.

20. A method for remotely modifying physical cards in a multi-node network environment, comprising the steps of:

a. providing the networked computerized card-modifying system according to claim 16;

b. operating one or more networked client access terminals to submit one or more requests for physically modifying the at least one selected unmodified card;

c. receiving the submitted one or more submitted requests by a BMS of said networked computerized card-modifying system;

d. locating a predetermined card modifying terminal of a plurality of card modifying terminals for each of said one or more submitted requests;

e. transmitting each of said requests to its predetermined card modifying terminal;

f. receiving unmodified card information and modified card analysis from each of said predetermined card modifying terminal associated with each of said one or more requests; and g. based on the analysis, informing the card issuing entity, and the corresponding one or more networked client access terminals.

21. The method according to claim 20, further comprising:

a. in step f), further receiving an image of the modified card;

b. based on the modified card analysis received in step f), determining whether the modified card is a winning card;

c. if said modified card is the winning card, providing the card for manual monitoring; and d. transmitting the image of the modified card to the originating networked client access terminal.

22. The method of claim 20, wherein the card issuing entity is a lottery administrating agency.

23. The method of any of claims 20, wherein in step (d) of locating the predetermined card modifying terminal, the predetermined card modifying terminal is determined as the card modifying terminal with the shortest queue for the selected unmodified card of the received request.

24. A method for remotely modifying physical cards, comprising:

a. providing a networked device for remotely modifying physical cards according to claim 1;

b. submitting a request to said networked device for modifying the at least one selected unmodified card; and c. operating said networked device to physically modify said at least one selected unmodified card, clean the physical modification residues therefrom, and capture one or more images of the card.

* * * * *